(12) United States Patent
Sheu et al.

(10) Patent No.: US 7,788,464 B2
(45) Date of Patent: Aug. 31, 2010

(54) SCALABILITY OF VIRTUAL TLBS FOR MULTI-PROCESSOR VIRTUAL MACHINES

(75) Inventors: John Te-Jui Sheu, Redmond, WA (US);
Ernest S. Cohen, Wyncote, PA (US);
Matthew D. Hendel, Seattle, WA (US);
Landy Wang, Redmond, WA (US);
Rene Antonio Vega, Kirkland, WA (US);
Sharvil A. Nanavati, Dundas (CA)

(73) Assignee: Microsoft Corporation, Redmond, WA (US)

( * ) Notice: Subject to any disclaimer, the term of this patent is extended or adjusted under 35 U.S.C. 154(b) by 745 days.

(21) Appl. No.: 11/644,502

(22) Filed: Dec. 22, 2006

(65) Prior Publication Data

US 2008/0155168 A1 Jun. 26, 2008

(51) Int. Cl.
*G06F 12/10* (2006.01)
(52) U.S. Cl. .......................... 711/207; 711/6
(58) Field of Classification Search ............. 711/6, 711/202, 203, 205, 206, 207; 718/104
See application file for complete search history.

(56) References Cited

U.S. PATENT DOCUMENTS

| | | | |
|---|---|---|---|
| 4,779,188 A | 10/1988 | Gum et al. .................. | 364/200 |
| 5,317,705 A | 5/1994 | Gannon et al. .............. | 718/100 |
| 5,428,757 A | 6/1995 | Sutton ....................... | 395/400 |
| 5,437,017 A | 7/1995 | Moore et al. ................ | 395/400 |
| 5,455,922 A | 10/1995 | Eberhard et al. ............ | 395/481 |
| 5,586,283 A | 12/1996 | Lopez-Aguado et al. .... | 711/207 |
| 5,699,543 A | 12/1997 | Saxena ....................... | 711/203 |
| 5,721,858 A | 2/1998 | White et al. ................ | 395/413 |

(Continued)

FOREIGN PATENT DOCUMENTS

JP      51-097342      8/1976

(Continued)

OTHER PUBLICATIONS

Bugnion, E. et al., "Disco:Running Commodity Operating Systems on Scalable Multiprocessors", *Proceedings of the 16th Symposium on Operating Systems Principles* (*SOSP*), Oct. 1997, 1-14.

(Continued)

*Primary Examiner*—Matt Kim
*Assistant Examiner*—Hal Schnee
(74) *Attorney, Agent, or Firm*—Woodcock Washburn LLP

(57) ABSTRACT

Various operations are provided that improve the scalability of virtual TLBs in multi-processor virtual machines, and they include: implicitly locking SPTs using per-processor generation counters; waiting for pending fills on other virtual processors to complete before servicing a GVA invalidation using the counters; write-protecting or unmaping guest pages in a deferred two-stage process or reclaiming SPTs in a deferred two-stage process; periodically coalescing two SPTs that shadow the same GPT with the same attributes; sharing SPTs between two SASes only at a specified level in a SPTT; flushing the entire virtual TLB using a generation counter; allocating a SPT to GPT from a NUMA node on which the GPT resides; having an instance for each NUMA node on which a virtual machine runs; and, correctly handling the serializing instructions executed by a guest in a virtual machine with more than one virtual processor sharing the virtual TLB.

16 Claims, 17 Drawing Sheets

U.S. PATENT DOCUMENTS

| | | | |
|---|---|---|---|
| 5,787,494 A | 7/1998 | DeLano et al. | 711/206 |
| 5,892,900 A | 4/1999 | Ginter et al. | 395/186 |
| 5,897,664 A * | 4/1999 | Nesheim et al. | 711/206 |
| 5,915,019 A | 6/1999 | Ginter et al. | 380/4 |
| 5,917,912 A | 6/1999 | Ginter et al. | 380/24 |
| 6,075,938 A | 6/2000 | Bugnion et al. | 703/27 |
| 6,182,195 B1 | 1/2001 | Laudon et al. | 711/141 |
| 6,442,666 B1 | 8/2002 | Stracovsky | 711/206 |
| 6,490,671 B1 * | 12/2002 | Frank et al. | 711/207 |
| 6,721,839 B1 | 4/2004 | Bauman et al. | 710/305 |
| 6,766,434 B2 | 7/2004 | Gaertner et al. | 711/207 |
| 6,785,886 B1 | 8/2004 | Lim et al. | 718/1 |
| 6,907,600 B2 | 6/2005 | Neiger et al. | 717/139 |
| 6,986,006 B2 | 1/2006 | Willman et al. | 711/163 |
| 7,058,768 B2 | 6/2006 | Willman et al. | 711/154 |
| 7,069,389 B2 | 6/2006 | Cohen | 711/135 |
| 7,069,413 B1 | 6/2006 | Agesen et al. | 711/207 |
| 7,111,145 B1 | 9/2006 | Chen et al. | 711/206 |
| 7,222,221 B1 * | 5/2007 | Agesen et al. | 711/141 |
| 2002/0082824 A1 | 6/2002 | Neiger et al. | 704/2 |
| 2002/0169938 A1 | 11/2002 | Scott et al. | 711/207 |
| 2003/0200412 A1 | 10/2003 | Peinado et al. | 711/202 |
| 2004/0003262 A1 | 1/2004 | England et al. | 713/189 |
| 2004/0215918 A1 * | 10/2004 | Jacobs et al. | 711/207 |
| 2005/0039180 A1 * | 2/2005 | Fultheim et al. | 718/1 |
| 2005/0044301 A1 | 2/2005 | Vasilevsky et al. | 711/1 |
| 2005/0044339 A1 | 2/2005 | Sheets | 711/206 |
| 2005/0050295 A1 * | 3/2005 | Noel et al. | 711/206 |
| 2005/0172099 A1 | 8/2005 | Lowe | 711/207 |
| 2006/0026383 A1 | 2/2006 | Dinechin et al. | 711/207 |
| 2006/0064567 A1 | 3/2006 | Jacobson et al. | 711/207 |
| 2006/0112212 A1 | 5/2006 | Hildner | 711/6 |
| 2006/0161734 A1 | 7/2006 | Cohen | 711/135 |
| 2006/0174053 A1 | 8/2006 | Anderson et al. | 711/6 |
| 2006/0230223 A1 * | 10/2006 | Kruger et al. | 711/6 |
| 2006/0259734 A1 | 11/2006 | Sheu et al. | 711/203 |
| 2007/0073993 A1 * | 3/2007 | Allen et al. | 711/170 |

FOREIGN PATENT DOCUMENTS

| | | |
|---|---|---|
| JP | 52-156518 | 12/1977 |
| JP | 63-024337 | 2/1988 |
| JP | 04-043445 | 2/1992 |
| JP | 05-225063 | 9/1993 |
| JP | 06-243043 | 9/1994 |
| JP | 2000-067009 | 3/2000 |

OTHER PUBLICATIONS

Coffing, C.L., "An x86 Protected Mode Virtual Machine Monitor for the MIT Exokernel", *Submitted to the Department of Electrical Engineering and Computer Science at the Massachusetts Institute of Technology*, May 1999, 109 pages.

Goldberg, R.P., "Survey of Virtual Machine Research", *Computer*, Jun. 1974, 34-45.

Matsuoka, H. et al., "Memory System for the Massively Parallel Computer RWC-1", *Information Processing Society of Japan*, Aug. 20, 1993, 93(71), 17-24.

Popek, G.J. et al., "Formal Requirements for Virtualizable Third Generation Architectures", *Communications of the ACM*, Jul. 1974, 17(7), 412-421.

Smith, J.E., "An Overview of Virtual Machine Architectures", Oct. 26, 2001, 1-20.

Suzuki, K. et al., "Time Stamp Invalidation of TLB-Unified Cache and Its Performance Evaluation", *The Transactions of The Institute of Electronics, Information and Communication Engineers, The Institute of Electronics, Information and Communication Engineers*, Dec. 25, 1997, vol. J80-D-I(12), 941-953.

Teller, P.J., "Translation-Lookaside Buffer Consistency", *Computer*, Jun. 1990, 23(6), 26-36.

Waldspurger, C.A., "Memory Resource Management in VMware ESX Server", *Proceedings of the 5th Symposium on Operating Systems Design and Implementation*, Dec. 9-11, 2002, 15 pages.

Chang, MS et al., "Lazy TLB Consistency for Large-Scale Multiprocessors," *IEEE*, http://ieeexplore.ieee.org/iel3/4457/12637/00581683.pdf?tp=&arnumber=581683&isnumber=12637&htry=2, 1997, 308-315.

Eranian, S. et al., "Virtual Memory in the IA-64 Linux Kernel," *Prentice Hall PTR*, www.phptr.com/articles/article.asp?p+29961&seqNum+4&r1+1, 2002, downloaded Aug. 31, 2006, 12 pages.

King, S. et al., "Operating System Support for Virtual Machines," *Proceedings of the 2003 USENIX Technical Conference*, http://www.eecs.umich.edu/virtualpapers/king03.pdf, 2003, 14 pages.

LeVasseur, J. et al., "Pre-Virtualization: Slashing the Cost of Virtualization," *Nat'l ICT Australia*, 2005, 1-14.

Rosenberg, B.S., "Low-Synchronization Translation Lookaside Buffer Consistency in Large-Scale Shared-Memory Multiprocessors," *ACM*, http://www.logos.t.u-tokyo.ac.jp/~tau/os-lecture/articles/p137-rosenburg.pdf#search=%22Translation-lookaside%20buffer%20consistency%22, 1989, 137-146.

Taylor, G. et al., "The TLB Slice—A Low-Cost High-Speed Address Translation Mechanism," *IEEE*, http://delivery.acm.org/10.1145/330000/325161/p355-taylor/pdf?key1=325161&key2=8514904611&coll=GUIDE&dl=GUIDE&CFID=4997640&CFTOKEN=80512607, 1990, 355-363.

Uhlig, V. et al., "Towards Scalable Multiprocessor Virtual Machines," *Proceedings of the 3rd Virtual Machine Research & Technology Symposium*, San Jose, CA, http://14ka.org/publications/2004/Towards-Scalable-Mutliprocessor-Virtual-Machines-VM04.pdf, May 6-7, 2004, 1-14.

VMware, Inc., "vmi_spec: Paravirtualization API Version 2.0," www.vmware.com/pdf/vmi_cpecs.pdf, 2006, 1-35.

* cited by examiner

SCALABILITY OF VIRTUAL TLBS FOR MULTI-PROCESSOR VIRTUAL MACHINES

FIELD OF TECHNOLOGY

The presently disclosed subject matter relates to the field of computing, and more particularly, to computer virtualization, although virtualization is merely an exemplary and non-limiting field.

BACKGROUND

A virtual machine monitor (VMM), such as a hypervisor, is a program that creates virtual machines, each with virtualized hardware resources which may be backed by underlying physical hardware resources. To virtualize memory, the VMM can implement virtual translation look-aside buffers (TLBs) that cache address translations from page tables specified by guest operating systems, much like a TLB in a physical processor. However, some operations associated with such virtual TLBs may be costly, since virtualization may entail several layers of translations between virtual memories (such as guest and hypervisor virtual memories) and physical memories (such as guest and system physical memories). Furthermore, virtual TLBs may consist of a large number of shadow page tables, so it may be impractical to implement one TLB for each virtual processor. Thus, it would be advantageous to provide mechanisms that could cope with virtual machines that have multi-processor architectures and share a virtual TLB between more than one virtual processor in an efficient and scalable manner.

SUMMARY

Various mechanisms are disclosed herein for improvement of scalability of virtual translation look-aside buffers (TLBs) in multi-processor virtual machines. These mechanisms can be manifested in the form of operations to be performed in any virtual machine running in a virtual environment. By way of example and not limitation, in one operation the virtual machine monitor (VMM) can implicitly lock shadow page tables (SPTs) using per-processor generation counters; using another operation, the VMM can wait for pending fills on other virtual processors to complete before servicing a guest virtual address (GVA) invalidation using the per-processor generation counters; using yet another operation, the VMM can write-protect or unmap guest pages in a deferred two-stage process; and, in a similar vein, the VMM can reclaim SPTs in a deferred two-stage process.

The VMM can also use additional optimization operations, such as: periodically coalescing two SPTs that shadow the same guest page table (GPT) with the same attributes; sharing SPTs between two shadow address spaces (SASes) only at a specified level in a shadow page table tree (SPTT); and flushing the entire virtual TLB using a generation counter. Furthermore, in combination with all these operations (or separately for that matter), the following operations can be performed: the virtual TLB can allocate a SPT to GPT from a non-uniform memory access (NUMA) node on which the GPT resides; the virtual TLB can have an instance for each NUMA node on which a virtual machine runs; and, lastly, the virtual TLB can correctly handle the serializing instructions executed by a guest in a virtual machine with more than one virtual processor sharing the virtual TLB.

It should be noted that this Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The foregoing Summary, as well as the following Detailed Description, is better understood when read in conjunction with the appended drawings. In order to illustrate the present disclosure, various aspects of the disclosure are illustrated. However, the disclosure is not limited to the specific aspects shown. The following figures are included.

DETAILED DESCRIPTION

Overview

The various aspect of the presently disclosed subject matter are divided into the following sections: (1) Virtual machines in general terms; (2) virtual machine translations and caches; and (3) improvement of scalability of virtual TLBs in multi-processor virtual machines in a virtual machine environment. All of these sections, when read individually, are meant to be read in light of the remaining sections. The present disclosure is not limited any one of these aforementioned sections or aspects disclosed therein.

Virtual Machines in General Terms

Figure 1:
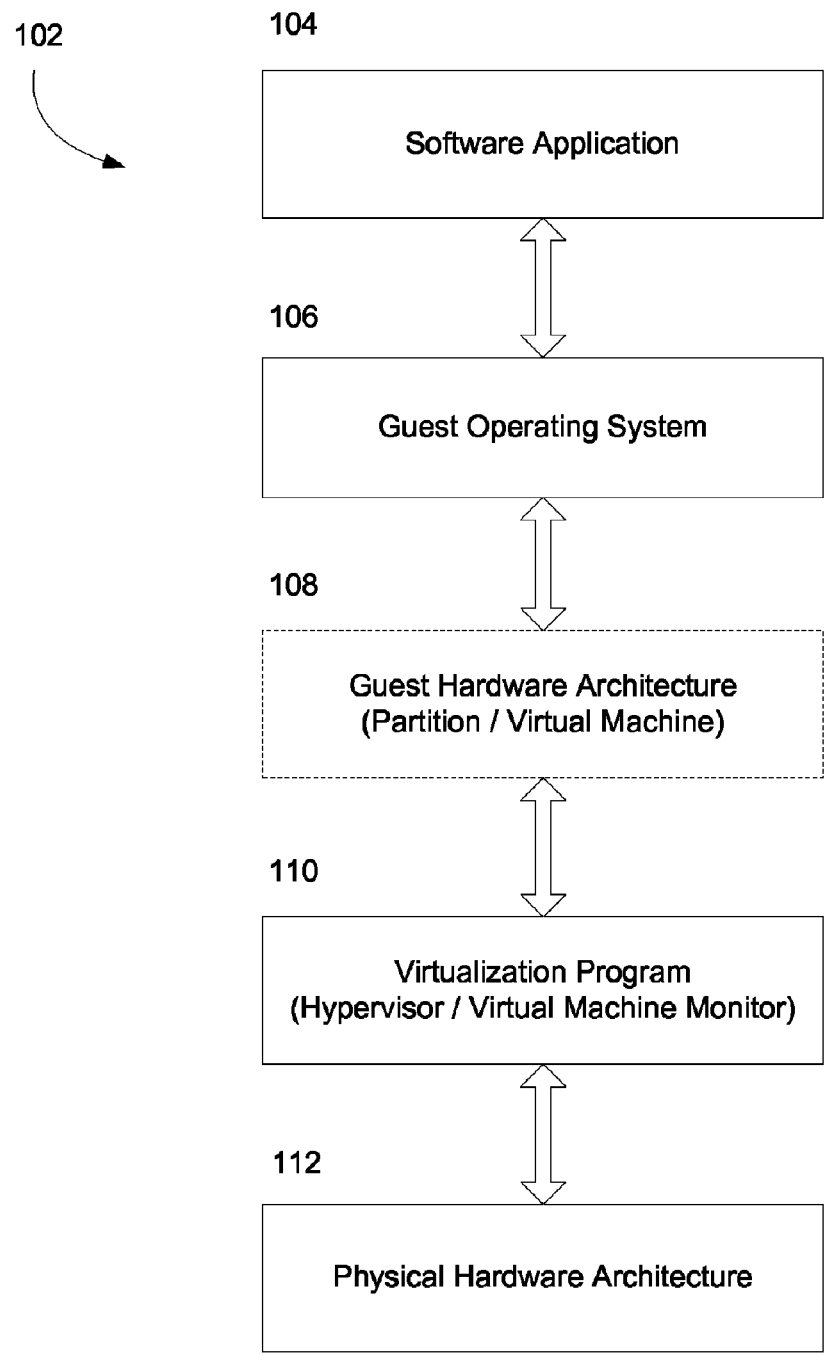
FIG. 1 is a block diagram representing the logical layering of the hardware and software architecture for virtualized operating environment in a computer system.

FIG. 1 is a diagram representing the logical layering of the hardware and software architecture for a virtualized environment in a computer system. In FIG. 1, a virtualization program 110 runs directly or indirectly on the physical hardware architecture 112. The virtualization program 110 may be (a) a virtual machine monitor that runs alongside a host operating system, (b) a host operating system with a hypervisor component, where the hypervisor component performs the virtualization, (c) hardware, or (d) micro-code. The virtualization program 110 virtualizes a guest hardware architecture 108 (shown as dashed lines to illustrate the fact that this component is a "partition" or a "virtual machine"), that is, hardware that does not actually exist but is instead virtualized by the virtualizing program 110. A guest operating system 106 executes on the guest hardware architecture 108, and a software application 104 can run on the guest operating system 106. In the virtualized operating environment of FIG. 1, the software application 104 can run in a computer system 102 even if the software application 104 is designed to run on an operating system that is generally incompatible with a host operating system and the hardware architecture 112.

Figure 2:
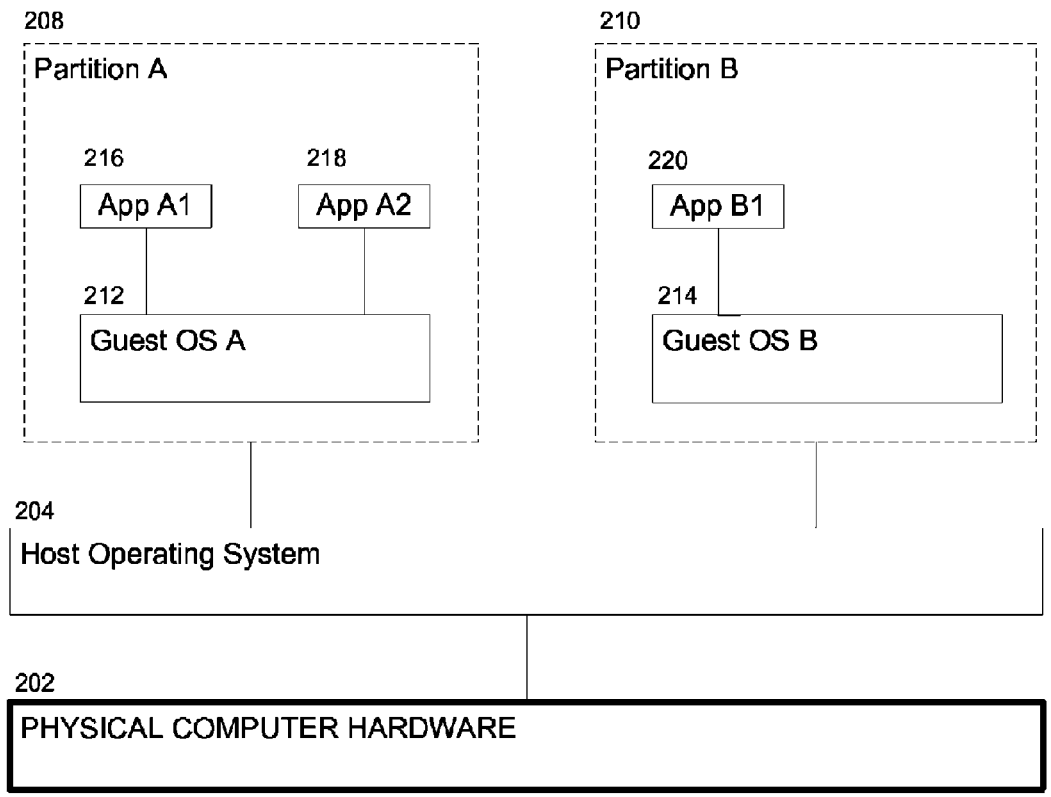
FIG. 2 is a block diagram representing a virtualized computing system, where virtualization is performed by the host operating system (either directly or via a hypervisor)

Next, FIG. 2 illustrates a virtualized computing system comprising a host operating system (host OS) software layer 204 running directly above physical computer hardware 202, where the host OS 204 provides access to the resources of the physical computer hardware 202 by exposing interfaces to partitions A 208 and B 210 for the use by operating systems A and B, 212 and 214, respectively. This enables the host OS 204 to go unnoticed by operating system layers 212 and 214 running above it. Again, to perform the virtualization, the host OS 204 may be a specially designed operating system with native virtualization capabilities or, alternately, it may be a standard operating system with an incorporated hypervisor component for performing the virtualization (not shown).

Referring again to FIG. 2, above the host OS 204 are two partitions, partition A 208, which may be, for example, a virtualized Intel 386 processor, and partition B 210, which may be, for example, a virtualized version of one of the Motorola 680X0 family of processors. Within each partition 208 and 210 are guest operating systems (guest OSs) A 212 and B 214, respectively. Running on top of guest OS A 212 are two applications, application A1 216 and application A2 218, and running on top of guest OS B 214 is application B1 220.

In regard to FIG. 2, it is important to note that partition A 208 and partition B 214 (which are shown in dashed lines) are virtualized computer hardware representations that may exist only as software constructions. They are made possible due to the execution of specialized virtualization software(s) that not only presents partition A 208 and partition B 210 to Guest OS A 212 and Guest OS B 214, respectively, but which also performs all of the software steps necessary for Guest OS A 212 and Guest OS B 214 to indirectly interact with the real physical computer hardware 202.

Figure 3:
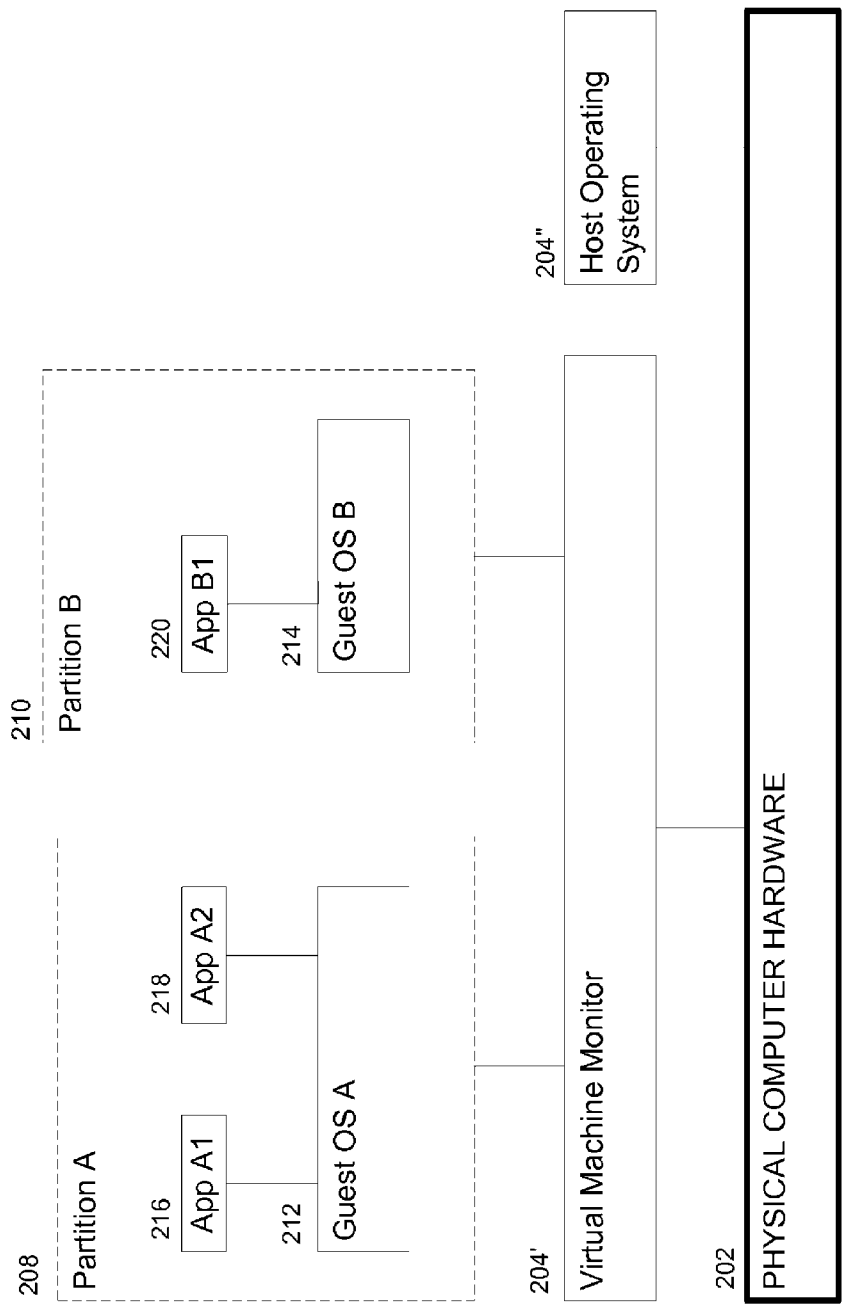
FIG. 3 is a block diagram representing an alternative virtualized computing system, where virtualization is performed by a virtual machine monitor (VMM) running alongside a host operating system.

FIG. 3 illustrates an alternative virtualized computing system where the virtualization is performed by a virtual machine monitor (VMM) 204' running alongside the host operating system 204". In certain cases, the VMM 204' may be an application running above the host operating system 204" and interacting with the computer hardware 202 only through the host operating system 204". In other cases, as shown in FIG. 3, the VMM 204' may instead comprise a partially independent software system that on some levels interacts indirectly with the computer hardware 202 via the host operating system 204", but on other levels the VMM 204' interacts directly with the computer hardware 202 (similar to the way the host operating system interacts directly with the computer hardware). And yet in other cases, the VMM 204' may comprise a fully independent software system that on all levels interacts directly with the computer hardware 202 (similar to the way the host operating system interacts directly with the computer hardware) without utilizing the host operating system 204" (although still interacting with the host operating system 204" in order to coordinate use of the computer hardware 202 and avoid conflicts and the like).

All of these variations for implementing the above mentioned partitions are just exemplary implementations, and nothing herein should be interpreted as limiting the disclosure to any particular virtualization aspect.

Virtual Machine Translations and Caches

As was mentioned above, a virtual machine monitor (VMM), such as a hypervisor, is a program that creates virtual machines, each with virtualized hardware resources which may be backed by underlying physical hardware resources. The operating system that runs within a virtual machine can be referred to as a guest. Each page of guest memory may be backed by a page of physical memory, but the physical address exposed to the guest is typically not the same as the actual physical address on the physical machine. In addition, the guest typically cannot access physical memory that has not been allocated to the virtual machine.

Many processor architectures can enforce a translation from virtual addresses (VA) to physical addresses (PA), specified by the operating system using data structures such as page tables. An address space can comprise of a tree of page tables, which may correspond to a sparse map from VAs to PAs. Programs running on the operating system access memory via virtual addresses, which enables operating systems to virtualize their memory and control their access to memory. The VMM can make an additional translation from guest physical addresses (GPA) to system physical addresses (SPA) to virtualize guest memory.

The guest operating system maintains guest page tables (GPT) that specifies GVA-to-GPA translations. The VMM enforces GPA-to-SPA translations and maintains shadow page tables (SPTs) that specify GVA-to-SPA translations, caching GVA-to-GPA translations from the guest page tables. The VMM points the physical processor to the SPTs so the guest software gets the correct system physical page when accessing a GVA.

Many processor architectures have a translation lookaside buffer (TLB) to cache VA-to-PA translations to avoid having to walk the page tables on every memory access, which is expensive. When the accessed VA is not cached in the TLB, which is known as a TLB miss, the processor's memory management unit (MMU) must walk the page tables starting from the base of the page table tree specified by the operating system, or the VMM in this case. The MMU can then add the VA-to-PA translation to the TLB, known as a TLB fill.

Some processor architectures define the TLB as a non-coherent cache of the page tables. The operating system or the VMM is responsible for notifying the processor of changes to the translations in its page tables to ensure the TLB does not have inconsistent or stale translations. Those processor architectures provide instructions to invalidate cached translations at a few granularities, such as invalidating a single translation and invalidating all translations. Architectures such as x86 and x86-64 invalidate all (non-global) cached translations when the register that points to the base of the page table tree is modified to switch between address spaces. The shadow page tables cache GVA-to-GPA translations in the guest page tables, effectively acting as a virtual TLB.

Figure 4:
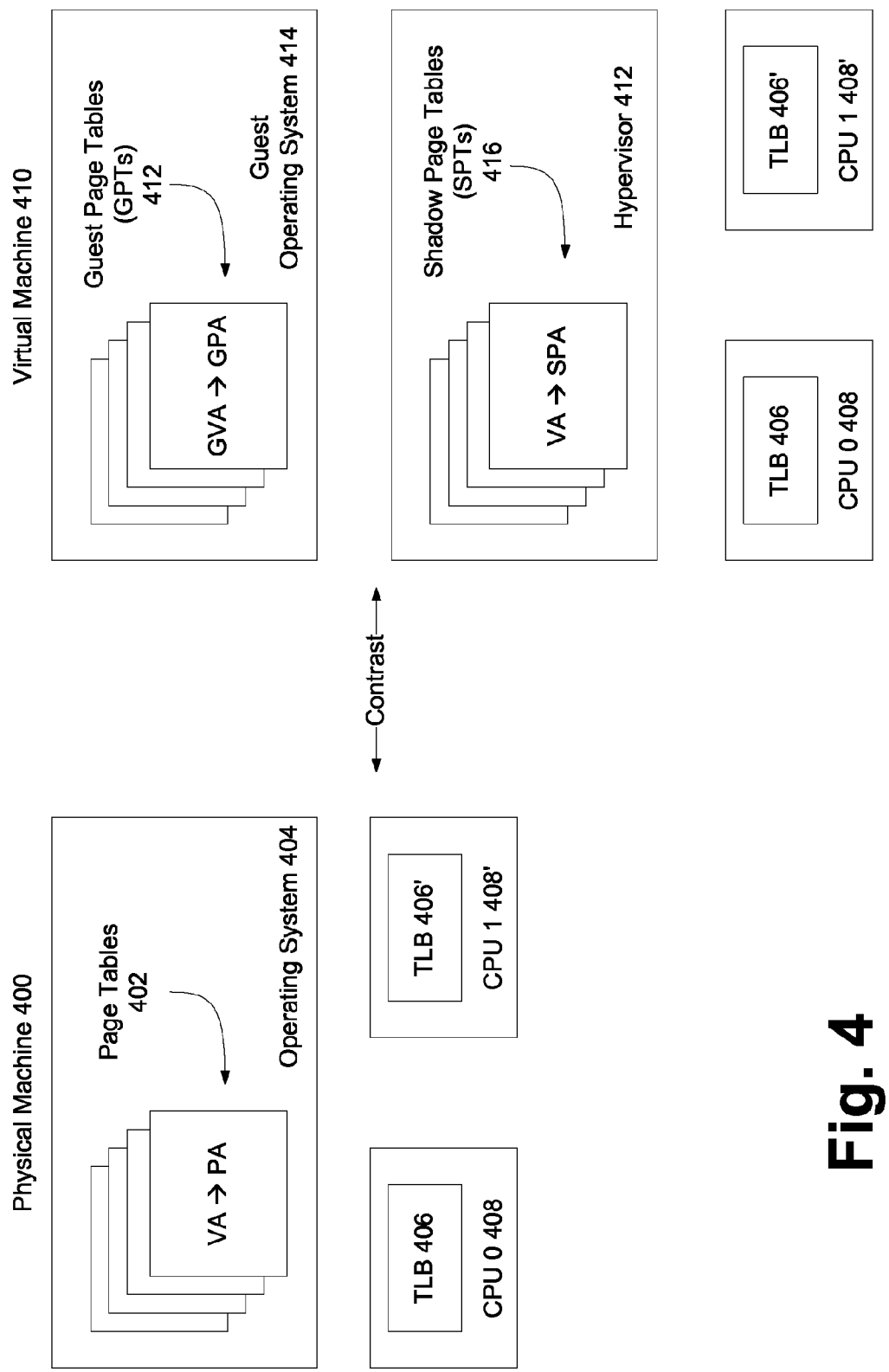
FIG. 4 illustrates the contrast between a physical machine architecture and a virtual machine architecture in order to further explain how terms, such as virtual addresses (VAs), physical addresses (PAs), guest virtual addresses (GVAs), guest physical addresses (GPAs), system physical addresses (SPAs), guest page tables (GPTs), shadow page tables (SPTs), and so on, relate to one another.

FIG. 4 illustrates the contrast between a physical machine 400 architecture and a virtual machine architecture 410, in order to further explain how all the terms discussed above and below, namely, how VAs, PAs, GVAs, GPAs, SPAs, GPTs, SPTs relate to one another. Specifically, a physical machine 400 may have its own associated pages tables 402 that contain VA-to-PA translations. Moreover, these VA-to-PA translations may be cached in TLBs on a per-processor basis: TLB 406 is associated with CPU 0 (central processing unit 0) 408, while TLB 406' is associated with CPU 1 408'.

In contrast to this physical machine 400 architecture, a virtual machine 410 architecture that is build on top of the physical machine 400, has more complex layers of page tables, namely, there are GPTs and SPTs. Per FIG. 4, GPTs 412 contain GVA-to-GPA translations associated with some guest operating system 414. Additionally, a VMM, such as a hypervisor 412, maintains SPTs that act as kind of virtual TLBs (vis-à-vis TLBs 406 and 406'). The virtual machine 410 architecture, just as the physical machine 400 architecture, also uses physical TLBs: TLB 406 and TLB 406', corresponding to CPU 0 408 and CPU 1 408', respectively.

The VMM builds up a cache of translations in the virtual TLB on demand as the guest accesses memory. The virtual TLB initially may not cache any translations. When the guest accesses a GVA for the first time, the processor generates a page fault exception and notifies the VMM of the virtual TLB miss, since there was no translation for that GVA in the SPT tree. The miss handler performs a virtual TLB fill at that GVA by walking the GPT tree to that GVA, reading the GVA-to-GPA translation, translating the GPA to an SPA, and filling the SPT entry with the newly cached GVA-to-SPA translation.

Figure 5:
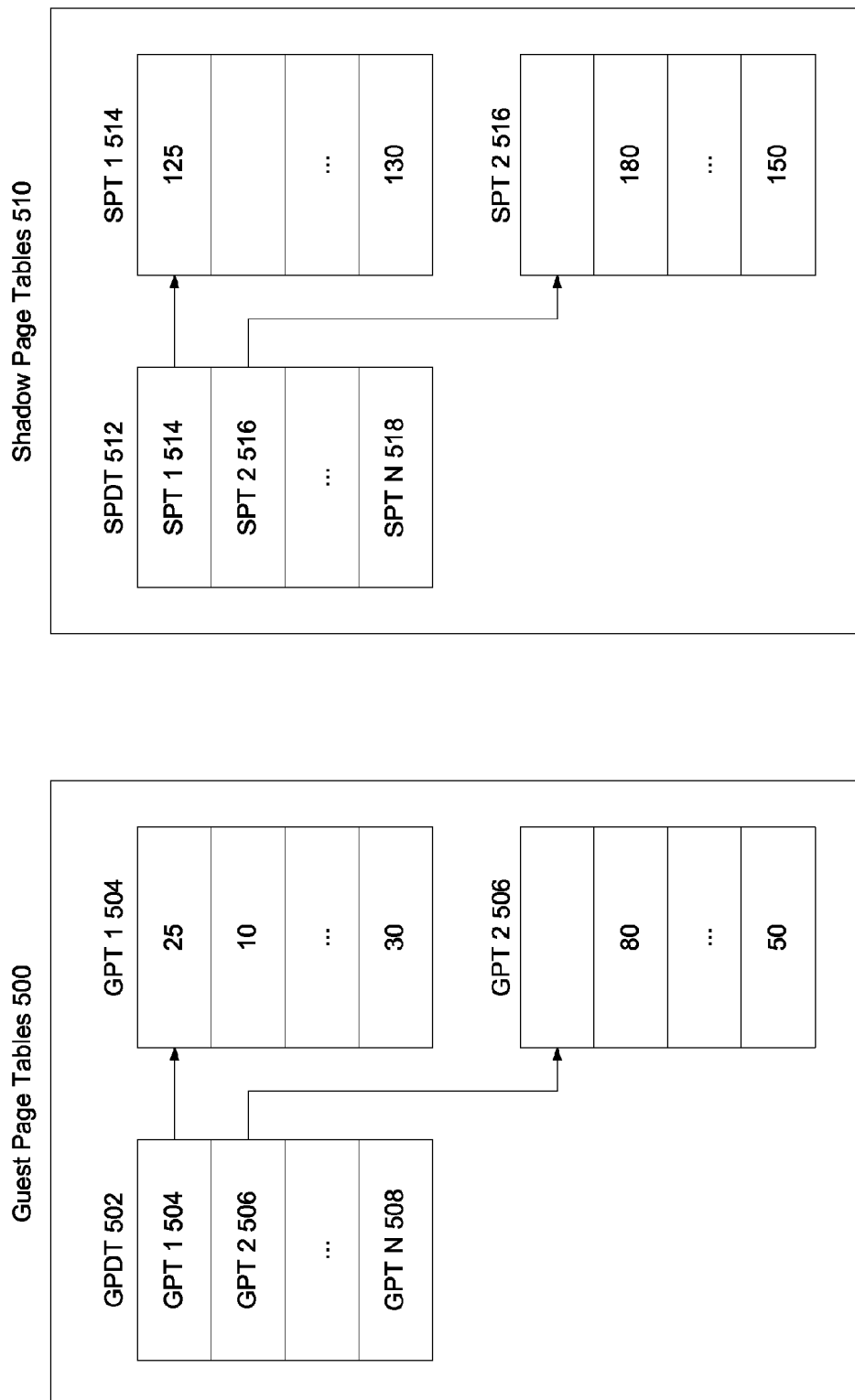
FIG. 5 illustrates the notion of performing a fill in a virtual TLB (comprised of shadow page tables) upon a miss.

FIG. 5 illustrates the notion of performing a fill in a virtual TLB upon a miss. A collection of guest page tables 500 are shown. A guest page directory (GPDT) 502 maintains a listing of all its corresponding guest page tables: GPT 1 504, GPT 2 506, and so on, until the last GPT N 508 (not shown)—page tables that are leaves in a tree such as GPT 1 504 and GPT 2 506 can be referred to as leaf or terminal page tables. The first guest page table, GPT 1 504, may have various entries, for example, guest physical addresses (25, 10, 30, and so on, which may have corresponding GVA entries—not shown). Similarly, the second guest page table, GPT 2 506, may have various guest physical address entries, such as 80, 50, and so on. A fill in a virtual TLB (upon a miss), may start out by having a miss handler walk the GPDT 502, identify the correct GPT, and then read the identified GPT entries.

For example, the miss handler could read entry "50" in GPT 2 506 and translate this guest physical address to a system physical address, say, "150". This latter value then, is filled in the corresponding shadow page table (acting as a virtual TLB), namely, SPT 2 516. Specifically, the entry "150" is placed in the appropriate slot of the SPT 2 516, which corresponds to the entry "50" in a slot of the GPT 2 506. Other values are similarly synchronized between guest page tables 500 and shadow page tables 510.

On the other hand, if a guest invalidates GVAs, the VMM must remove the GVA-to-SPA translations from the SPTs and the underlying hardware TLBs. It is expensive to flush virtual TLBs whenever the guest switches between address spaces. Thus, as will be shown next, in other aspects of the presently disclosed subject matter, performance and scalability of guest memory virtualization algorithms can be improved on by building upon other related and commonly assigned subject matter disclosed in U.S. patent application Ser. No. 11/128,982, entitled "Method and system for caching address translations from multiple address spaces in virtual machines" (disclosing algorithms implementing tagged TLBs in software, which cache and retain translations from multiple address spaces at a time, maintaining multiple shadow address spaces, each of which is a tree of shadow page tables, and caching translations from a guest address space), and U.S. patent application Ser. No. 11/274,907, entitled "Efficient operating system operation on a hypervisor" (describing how the VMM can expose a set of APIs known as hypercalls, some of which perform virtual TLB operations; those operations enable an enlightened guest to provide hints and use less expensive virtual TLB operations).

Virtualization in Multi-Processor Virtual Machines

In one aspect of the presently disclosed subject matter, the virtual machine monitor (VMM) implicitly locks shadow page tables (SPTs) using per-processor generation counters. The VMM has to prevent a SPT from being reclaimed and freed while a virtual processor (VP) is accessing it. However, locking and unlocking a SPT upon each access is expensive, especially on critical paths such as the virtual translation look-aside buffer (TLB) miss handler, which may access four or more SPTs.

Figure 17:
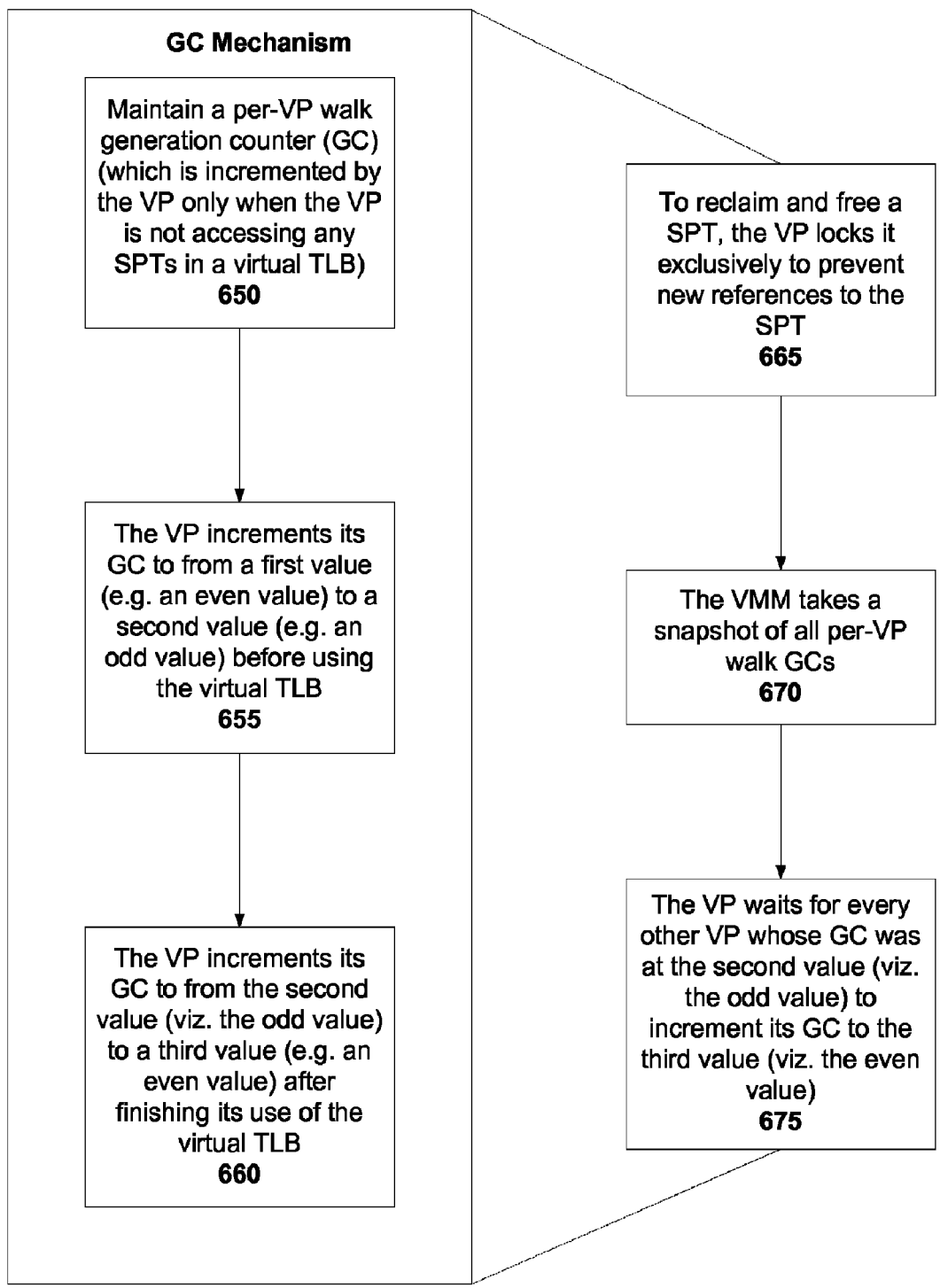
FIG. 17 illustrates how the VMM implicitly lock SPTs using per-processor generation counters.

Each SPT has a reference count indicating how many entries in higher-level SPTs point to it. In the case of a top-level SPT, the reference count indicates the number of VPs running in that shadow address space. When its reference count drops to zero, the SPT cannot be freed immediately since a VP may have read the reference that was just removed and may still be accessing the SPT. FIG. 17 shows in a block diagram that the VMM maintains a per-VP walk generation counter, which is incremented by a VP only when the VP is not accessing any SPTs (block 650). For example, a virtual processor could increment its walk generation counter to an odd value immediately before using the virtual TLB (block 655) and increment it again to an even value after finishing its use of the virtual TLB (block 660). To reclaim and free a SPT, the VMM acquires an exclusive lock on the SPT to prevent new references to the SPTs by, for example, atomically updating the reference count from zero to a value that indicates no new references are permitted (block 665), then takes a snapshot of all per-VP walk generation counters (block 670), and then waits for every other VP whose walk generation counter was an odd value to increment its counter to an even value (block 675)—it should be noted that the block 665, 670, 675 sequence is important in that its purpose is to reclaim shadow page table safely by ensuring that it is no longer in use by any virtual processor by the time that it is repurposed (i.e. used for another purpose). This wait ensures that any VP that might have been accessing the SPT is no longer doing so. In effect, each per-VP walk generation counter acts as an implicit lock on any SPT that had a non-zero reference count at or since the last time it was incremented to an odd value. This implicit lock prevents any other VP from reclaiming the SPT and using the table for other purposes.

This technique provides for a VP servicing a fill or invalidation in the virtual TLB so that it does not need to lock a SPT prior to accessing it, provided that the VP gets to the table via an existing reference. Even if that reference goes away after it is read, the VP's walk generation counter holds an implicit lock on the SPT to prevent the SPT from being repurposed (used by another module). This technique eliminates explicit locking on critical paths which would negatively impact performance and scalability.

Figure 6:
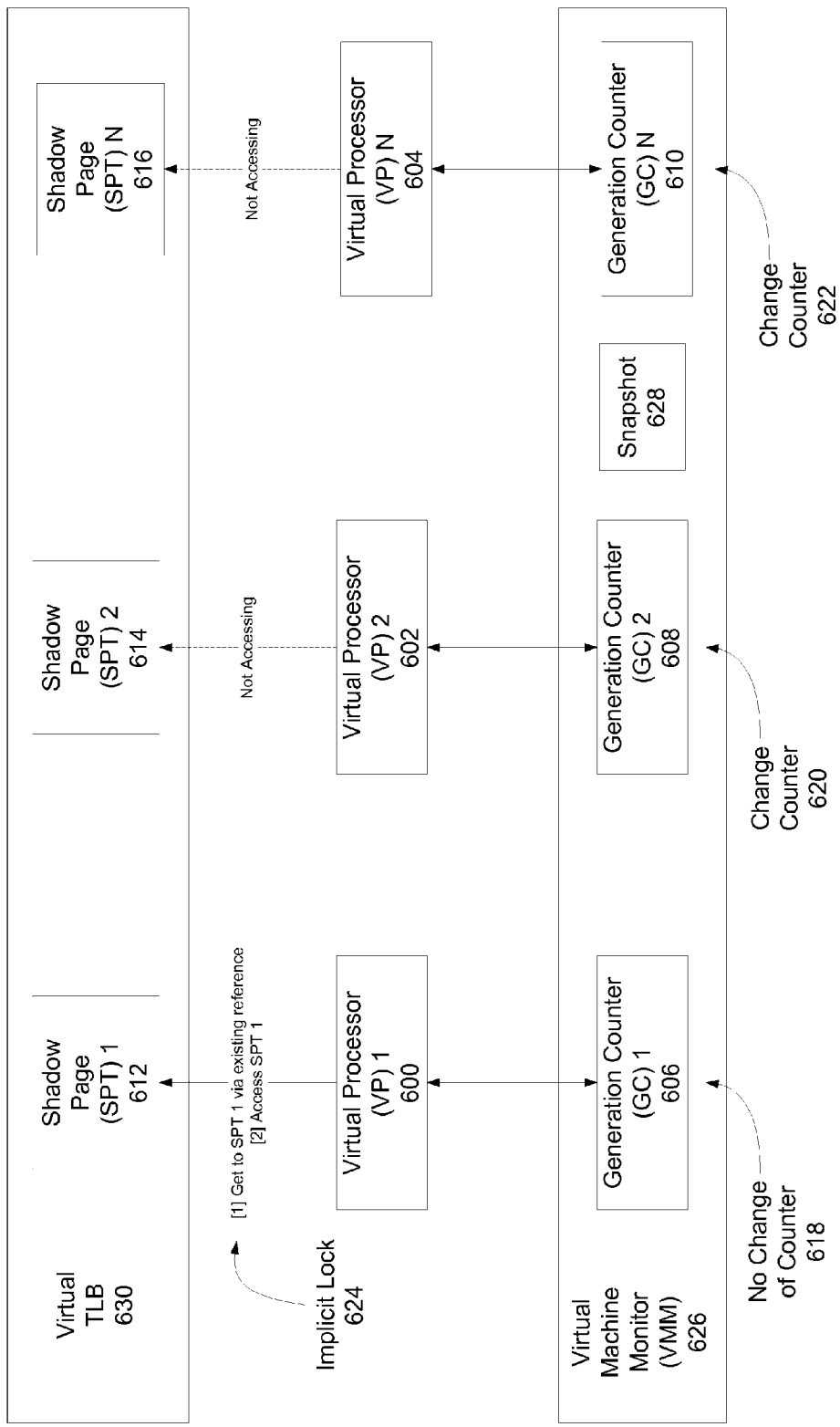
FIG. 6 illustrates the general architecture of having the VMM implicitly lock SPTs using per-processor generation counters.

FIG. 6 illustrates a general architecture of process described above in the block diagram of FIG. 17. In FIG. 6, the VMM 626 maintains a generation counter (GC) 1 606 for virtual processor (VP) 1 600, a generation counter (GC) 2 606 for virtual processor (VP) 2 602, up to a generation counter (GC) N 606 for virtual processor (VP) N 604, where N can be the last VP in a set of VPs 1 through N. The VMM can take a snapshot 628 of each of the generation counters 606, 608, 610, and the VMM can disallow the reclaiming of any SPTs previously locked exclusive until all the generation counters 606, 608, 610 whose snapshot value indicated the corresponding VP may be accessing SPTs have advanced past said snapshot value, e.g., an increment of one (e.g. from the mentioned odd value to the mentioned even value).

In one non-limiting aspect, the generation counters 606, 608, 610 can change in value only when their corresponding VPs 600, 602, 604 are not accessing any SPTs, such as SPTs 612, 614, 616, respectively, that reside in a virtual TLB 630. In another non-limiting aspect, an odd value can indicate the VP is not accessing SPTs and an even value can indicate the VP is accessing SPTs. Once a SPT has no references and is locked exclusive to prevent new references, it may be reclaimed to be used to shadow other GPTs only after the most recent state of generation counters indicate that any VP may have been accessing the SPT is no longer doing so. Taking the snapshot after the SPT is locked exclusive and then comparing the snapshot against the most recent state of generation counters can be used to determine whether any VPs may be accessing the SPT being reclaimed.

Figure 7:
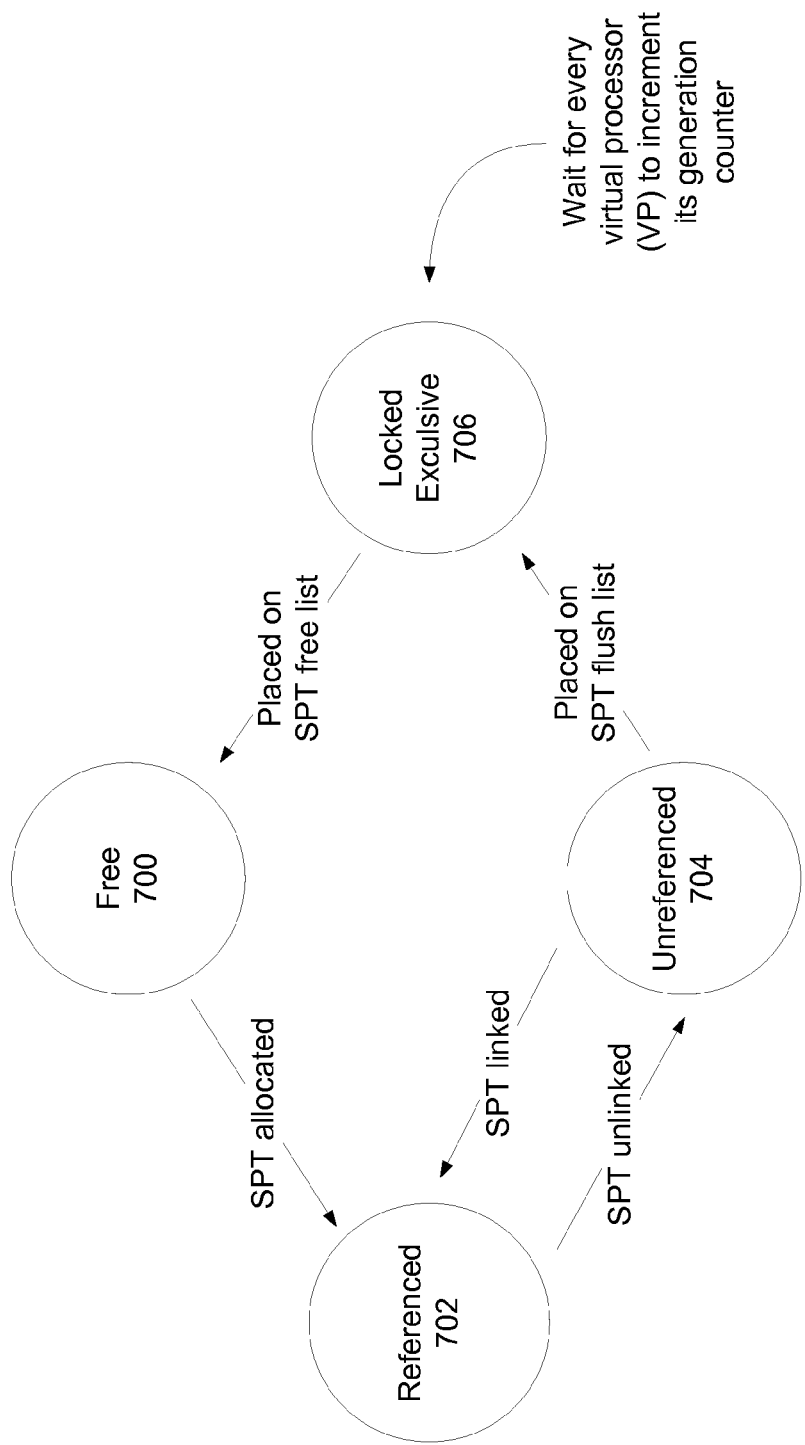
FIG. 7 illustrates a state diagram for the subject matter discussed with reference to FIG. 6.

FIG. 7 illustrates a state diagram for the subject matter discussed with reference to FIGS. 6 and 17. In FIG. 7, starting at 700, a SPT may be free and not allocated. At state 702, the SPT has been allocated from the free list and is referenced by one or more VPs or other SPTs in a virtual TLB. At state 704, the SPT may have no references (e.g., may be unlinked) and may reside on a list of unreferenced SPTs. In this state, such a SPT can be locked exclusive to prevent new references and then placed on a SPT flush list at state 706. Alternatively, the SPT may be linked to another SPT and return to the Referenced state 702. Upon entry into state 706, the VMM takes a snapshot of per-VP walk generation counters. In this state 706, the VMM can wait for every VP that had an odd counter value in the snapshot to increment its walk generation counter past the value in the snapshot, and once this is accomplished, the SPT can be freed, going back to the original free state 700.

Figure 8:
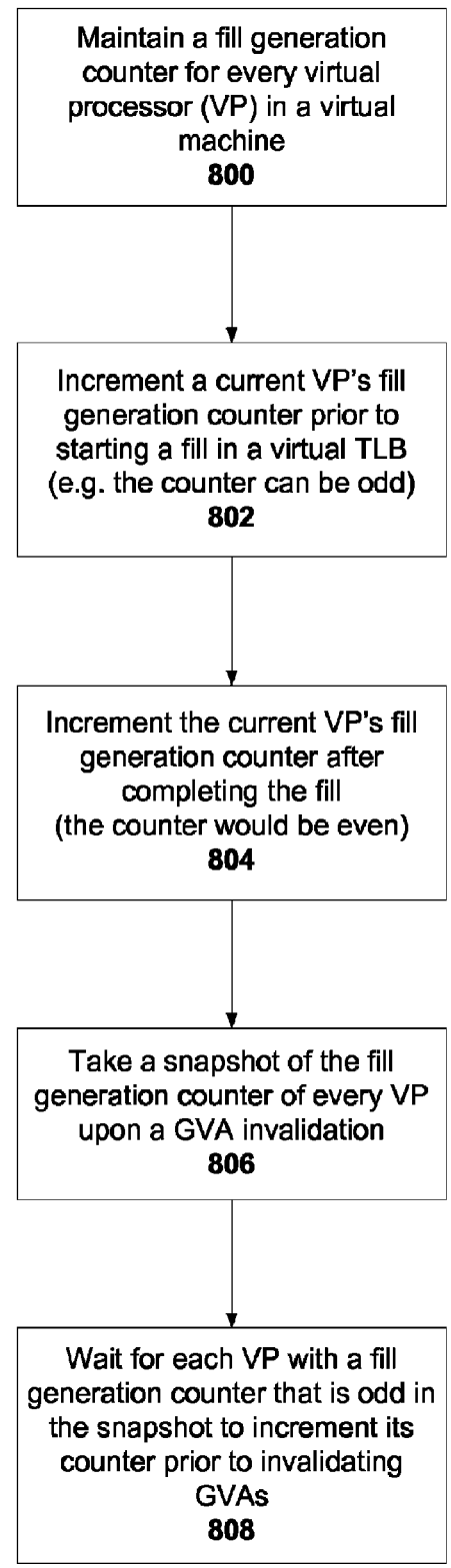
FIG. 8 illustrates that the VMM waits for pending fills on the virtual processors to complete before servicing a guest virtual address invalidation request.

In another aspect of the presently disclosed subject matter, FIG. 8 illustrates that the VMM waits for pending fills on the virtual processors to complete before servicing a guest virtual address invalidation request (such as INVLPG, in the x86 architecture, or TLB invalidation hypercalls made by enlightened guests—guests that know they are running in an virtual machine environment), using the aforementioned per-VP generation counters. The VMM has to drain any pending fills in the virtual TLB at the time of the GVA invalidation request, because some processor architectures such as x86 have ordering guarantees that require that an invalidated GVA-to-GPA translation is not added to the virtual TLB by another virtual processor after the GVA invalidation has completed. This aspect of the presently disclosed subject matter uses a per-VP fill generation counter that is incremented before and after a fill. This enables a VP to determine when pending fills on other VPs that started prior to the invalidation request have completed, by reading the counter, determining whether a fill is in progress, and waiting on the counter if necessary. In one exemplary and non-limiting embodiment, the fill generation counter may be combined with the walk generation counter described in the previous aspect.

Turning now to FIG. 8, a flow chart is provided, with the understanding that fill generation counters are analogous to that of generation counters depicted in FIG. 6, and thus the architecture depicted in FIG. 6 is analogous to that of FIG. 8. Turning to FIG. 8, at block 800, the VMM can maintain a fill generation counter for every VP in any given virtual machine. Then, at block 802, any current VP's fill generation counter can be incremented prior to starting a fill in a virtual TLB (for example, the counter can be odd numbered). Next, at block 804, the current VP's fill generation counter can be again incremented after completing the fill (based on the previous example mentioned, the counter would then be even numbered). At block 806, a snapshot of the fill generation counter of every VP can be taken, upon receiving a GVA invalidation request. Finally, at block 808, the VMM can wait for each VP with a fill generation counter that is odd numbered, to increment its counter past the value in the snapshot, before proceeding with the invalidation of any GVAs.

Figure 9:
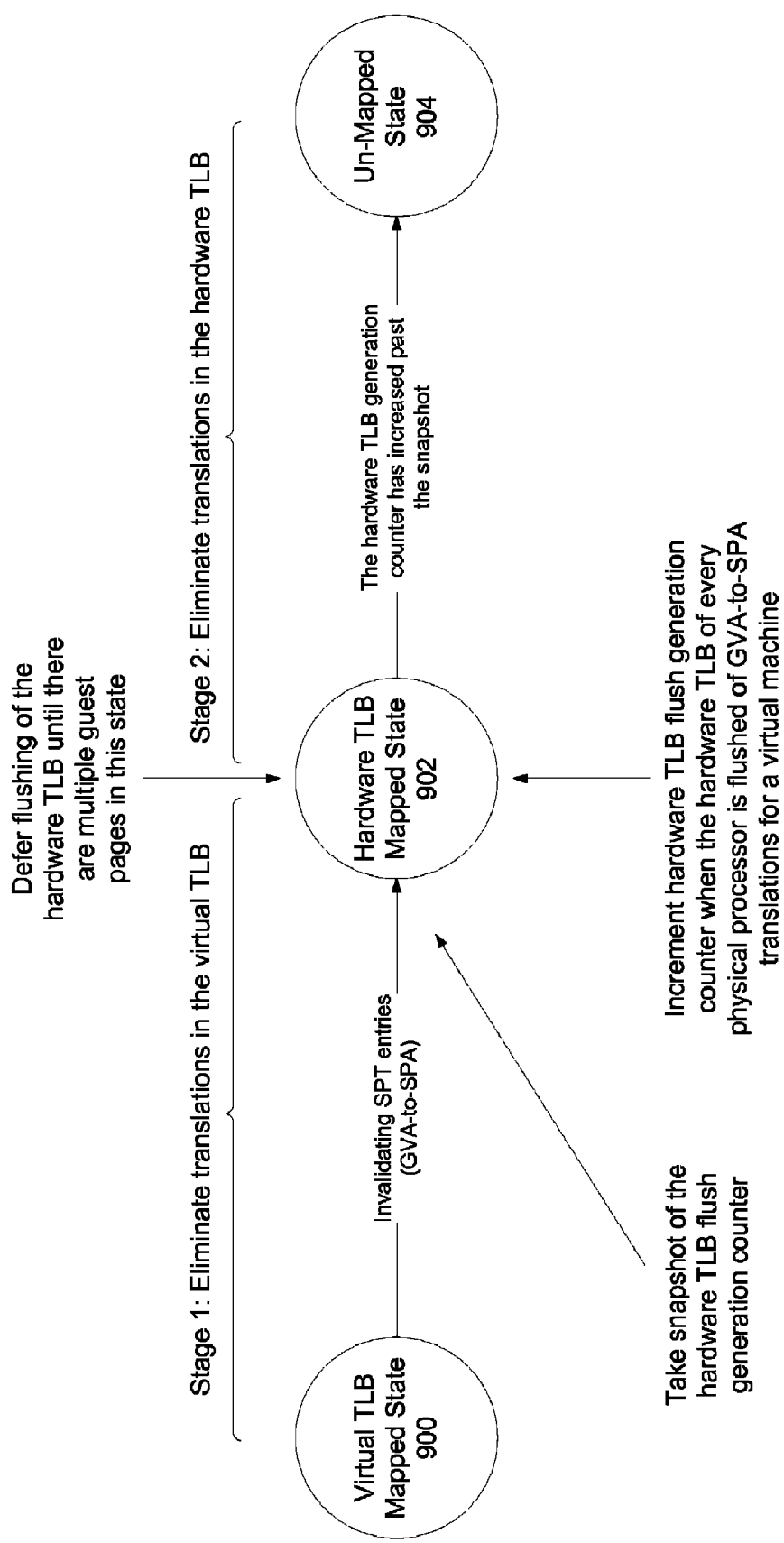
FIG. 9 illustrates that the VMM can write-protect or unmap guest pages in a deferred two-stage process.

In another aspect of the presently disclosed subject matter, FIG. 9 illustrates that the VMM can write-protect or un-map guest pages in a deferred two-stage process. Typically, the VMM can immediately write-protect or un-map a guest page by invalidating any SPT entry that maps the guest page, and flush the hardware TLB of any physical processor that may have cached the translations. However, sending an inter-processor interrupt to invalidate the hardware TLB of other physical processors is expensive and diminishes scalability.

Thus, in this aspect, the solution is to defer the flush of the hardware TLB, effectively batching the write-protection or un-mapping of multiple guest pages to reduce the frequency of such flushes. In addition, there are times when the VMM must flush the hardware TLB in response to a GVA invalidation request by the guest, so the flush required to write-protect or un-map a guest page comes for free. This requires the VMM to write-protect or un-map using a two-stage pipeline. The first stage is to eliminate the translations in the virtual TLB. The second stage is to eliminate the translations in the hardware TLB.

In other words, this aspect reduces the rate of inter-processor interrupts and hardware TLB flushes, while still permitting the VMM to write-protect and un-map guest pages, but with a slightly higher latency. Turning now to FIG. 9, three states for guest page are shown: a virtual TLB mapped state 900; a hardware TLB mapped state 902; and an un-mapped state 904. In state 900, the translation is cached in the virtual TLB and possibly the hardware TLBs. In state 902, the translation is no longer in the virtual TLB but may still be in the hardware TLB. Stage 1 of this aspect comprises eliminating translations in the virtual TLB, i.e., a first transition from first state 900 to the second state 902. Upon entry into state 902, the VMM tags the translations removed from the virtual TLB with a snapshot of the hardware TLB flush generation counter. Stage 2 comprises eliminating translations in the hardware TLB, i.e., a second transition from the second state 902 to the third state 904. While in the second state 902, the flushing of the hardware TLB is deferred until there are multiple translations to be flushed or there is another reason to flush the hardware TLB. This batches the flushing of multiple translations from the hardware TLB. It should be noted that in transitioning from the hardware TLB mapped state 902 to the un-mapped state 904, any hardware TLB translations on all physical processors underlying the shadow page table translations are eliminated in batched manner but they can be eliminated such that only the TLB translation that are stored on the associated physical processors are removed (but not TLB translation on physical processors that do not underlay the shadow page tables). Thus, this is smart flushing (as opposed to wholesale flushing of TLBs).

Also, the hardware TLB flush generation counter is incremented when the hardware TLB of every physical processor is flushed of GVA-to-SPA translations for any given virtual machine. The second state 902 transitions into the third state 904 when the hardware TLB generation counter has increased past the snapshot taken when it first entered state 902. At the un-mapped state 904, translations have been flushed in batch from the physical TLBs.

In another aspect of the presently disclosed subject matter, the VMM can immediately reclaim and free a SPT by locking it exclusive and waiting for every VP to increment its walk generation counter, but the cost of the wait may be high. Instead, the VMM may use a two-stage pipeline where the first stage is to lock SPTs exclusive and place them on a flush list, and the second stage is to free the SPTs on the flush list. The second stage is deferred until the per-VP walk generation counters have incremented, so no processor has to explicitly wait on the counters (as described in the first aspect). The flush list keeps a snapshot of the counters, whether a snapshot for the entire list or a snapshot for one or more SPTs in the list, so the VMM can determine whether every counter has incremented since each SPT was pushed onto the list. Thus, this aspect enables the VMM to lazily reclaim shadow page tables in a pipelined fashion to ensure that there are almost always free SPTs, which helps the VPs avoid having to waiting on the walk generation counters.

Figure 10:
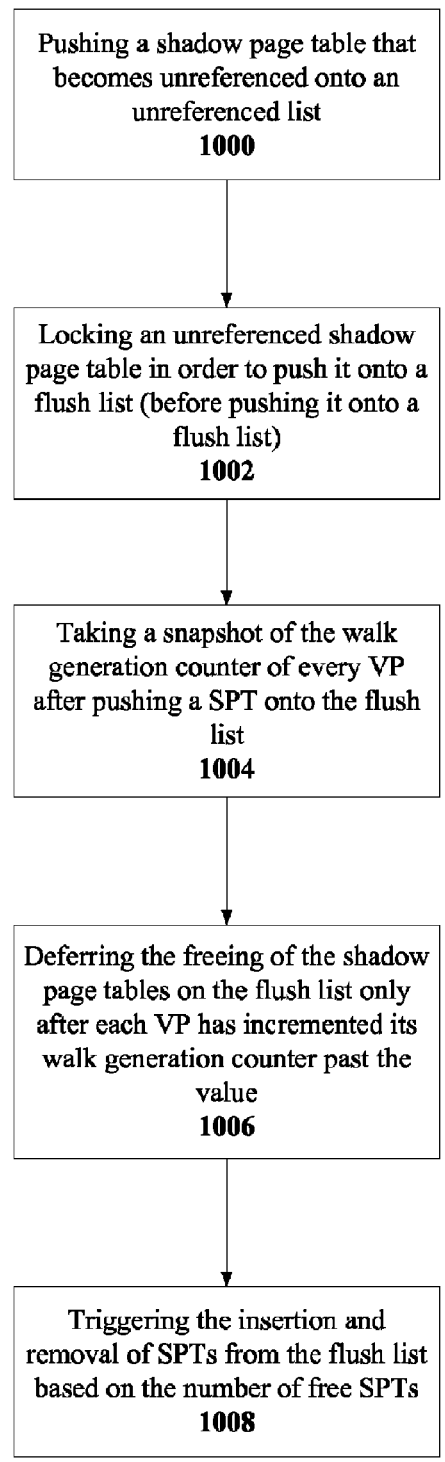
FIG. 10 illustrates how the VMM reclaims shadow page tables in a deferred two-stage process.

FIG. 10 illustrates how the VMM reclaims shadow page tables in a deferred two-stage process. At block 1000, a shadow page table that becomes unreferenced (i.e. is not referenced by other shadow page tables) is pushed onto a list of unreferenced SPTs. Many such unreferenced SPTs can be resident on the unreferenced list. Then, at block 1002, an unreferenced shadow page table is locked exclusive before pushing it onto a flush list (a list of tables to be freed eventually). This lock prevents a VP from increasing the reference count of the SPT. Once this is accomplished, at block 1004, a snapshot of the walk generation counter of every VP is taken. This snapshot can serve as a baseline, so that once every VP's generation counter increments passed a certain value, the SPTs can be then freed since no VP can be accessing those tables (as explained in the first aspect). Thus, at block 1006, the freeing of the shadow page tables on the flush list is deferred until each VP has incremented its walk generation counter past the value in the snapshot. This makes it such that no VP has to explicitly wait for the generation counters to increment since this happens in the background. Interestingly, at block 1008, an action comprising of triggering the insertion and removal of SPTs from the flush list can be executed, based on the number of free SPTs. This action allows for improved management of free SPTs, such as avoiding situation wherein the virtual TLB runs out of free SPTs. This mechanism can also be used to permanently deallocate page tables from the virtual TLB by returning the page tables to the memory pools of the VMM instead of pushing them onto the free list.

Figure 11:
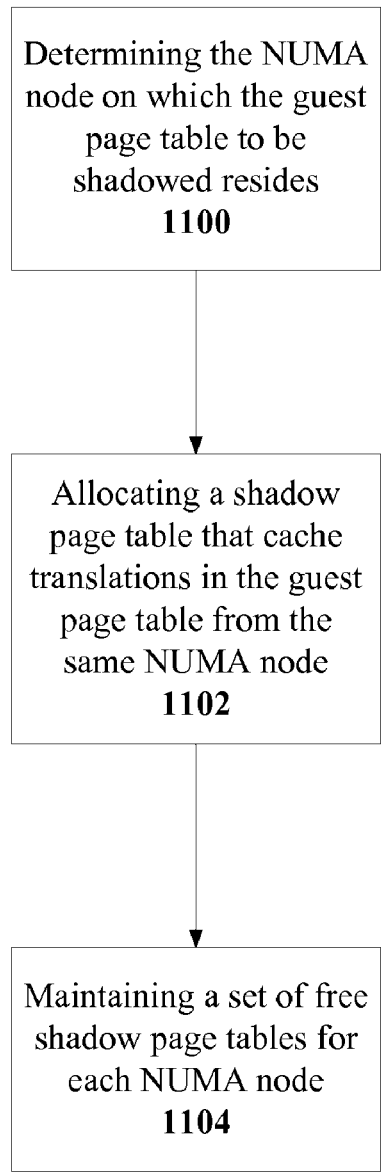
FIG. 11 illustrates how the virtual TLB allocates a SPT to shadow a guest GPT from the Non-Uniform Memory Access (NUMA) node on which the guest page table resides.

In another aspect of the presently disclosed subject matter, FIG. 11 illustrates how the virtual TLB allocates a shadow page table (SPT) to shadow a guest page table (GPT) residing on the same Non-Uniform Memory Access (NUMA) node on which the guest page table resides. A NUMA node may comprise several processors connected via a memory bus to memory resources. A plurality of different NUMA nodes may be interconnected via some high speed interconnection. Some operating systems allocate page tables from a specific NUMA node, based on the processors on which a process's threads are likely to be scheduled. They may also use a page-coloring algorithm to evenly allocate page tables among NUMA nodes, if the process may run on more than one node.

The virtual TLB would improve scalability if it took into consideration the NUMA node of a GPT when allocating a SPT to cache translations from the guest page table. Using this insight increases the likelihood that the SPT is on the same NUMA node as the processor that is walking it. Thus, per FIG. 11, at block 1100, a determination is made regarding the NUMA node on which a GPT to be shadowed resides. Once this is accomplished, at block 1102, a SPT is allocated that caches translations from the mentioned GPT from the same NUMA node. Finally, at block 1104, a set of free SPTs for each NUMA node is maintained, if multiple NUMA nodes exist, in order to improve the efficiency of allocating an SPT on a specific NUMA node.

Figure 12:
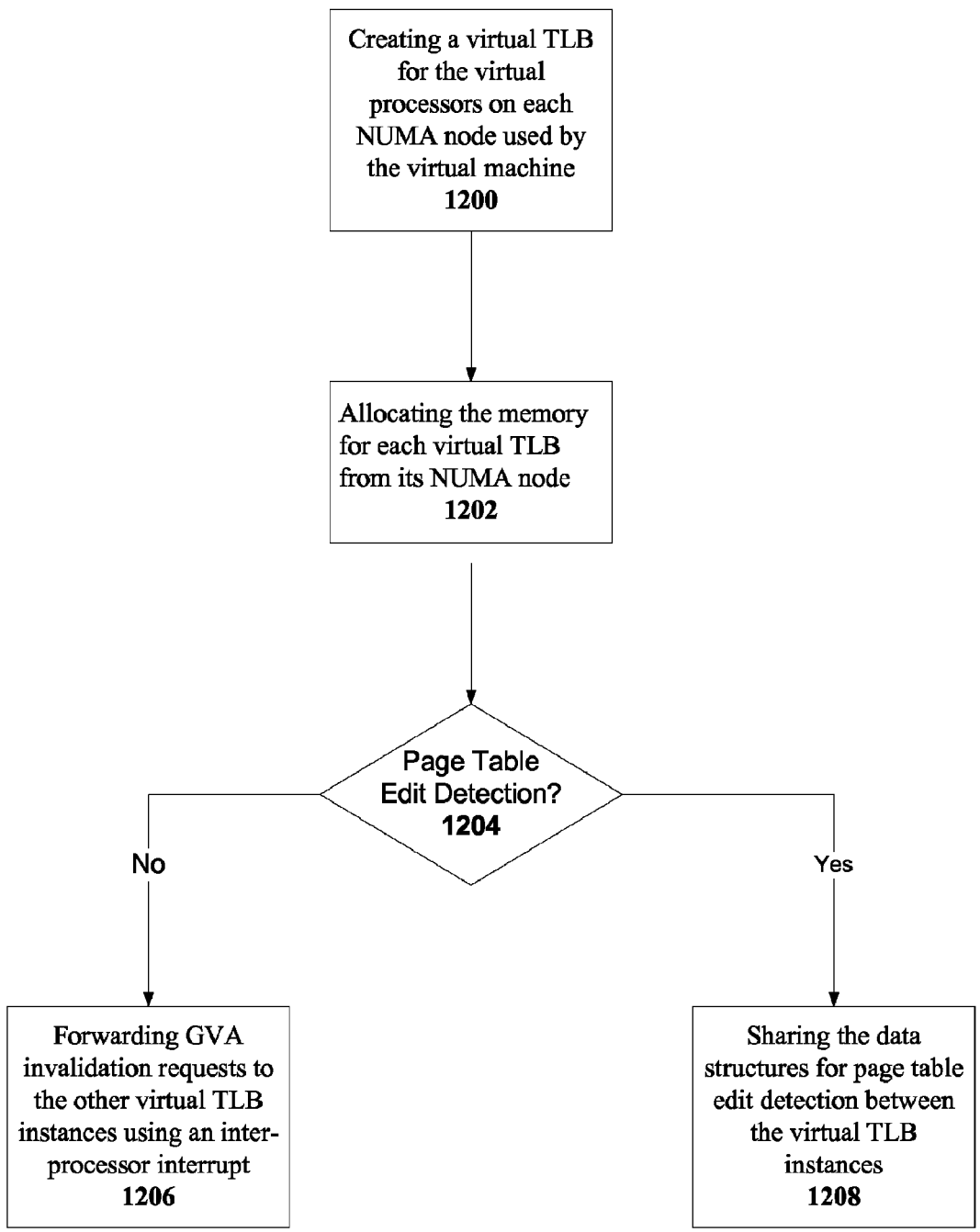
FIG. 12 illustrates that the virtual TLB has an instance for each NUMA node on which the virtual machine runs.

In another aspect of the presently disclosed subject matter, FIG. 12 shows that the virtual TLB has an instance for each NUMA node on which the virtual machine runs. A typical virtual TLB algorithm implements a single virtual TLB that is shared by all VPs in the virtual machine. However, this algorithm can be extended to implement a virtual TLB shared by all VPs on each NUMA node that the virtual machine runs on. This improves scalability, since each processor walks shadow page tables that are allocated from memory on its NUMA node.

Thus, at block 1200, virtual TLBs are created for their respective NUMA nodes. Then, at block 1202, memory is allocated for each of the virtual TLBs from its NUMA node. If, on the one hand, page table edit detection is not required, at block 1204, as in the case of enlightened guests, each NUMA node can have its own instance of a virtual TLB with no data structures shared between NUMA nodes (where it is understood that "page table edit detection" refers to logic to detect when a writable translation has been created in the virtual TLB such that the guest is able to modify a guest page table, which means a shadow page table may have stale translations cached). When a guest makes a GVA invalidation request that must be made effective on all VPs, the VMM forwards the request onto each virtual TLB instance using a heuristic such as synchronous inter-processor interrupt, as is shown at block 1206. On the other hand, at block 1204, if page table edit detection is required, the VMM can share the data structures (where these data structures should store state that is relevant to the entire VM, not just a specific instance of the virtual TLB) for the detection between the virtual TLB instances, as is shown at block 1208. In this case, each virtual TLB instance would consult and update those data structures.

Figure 13:
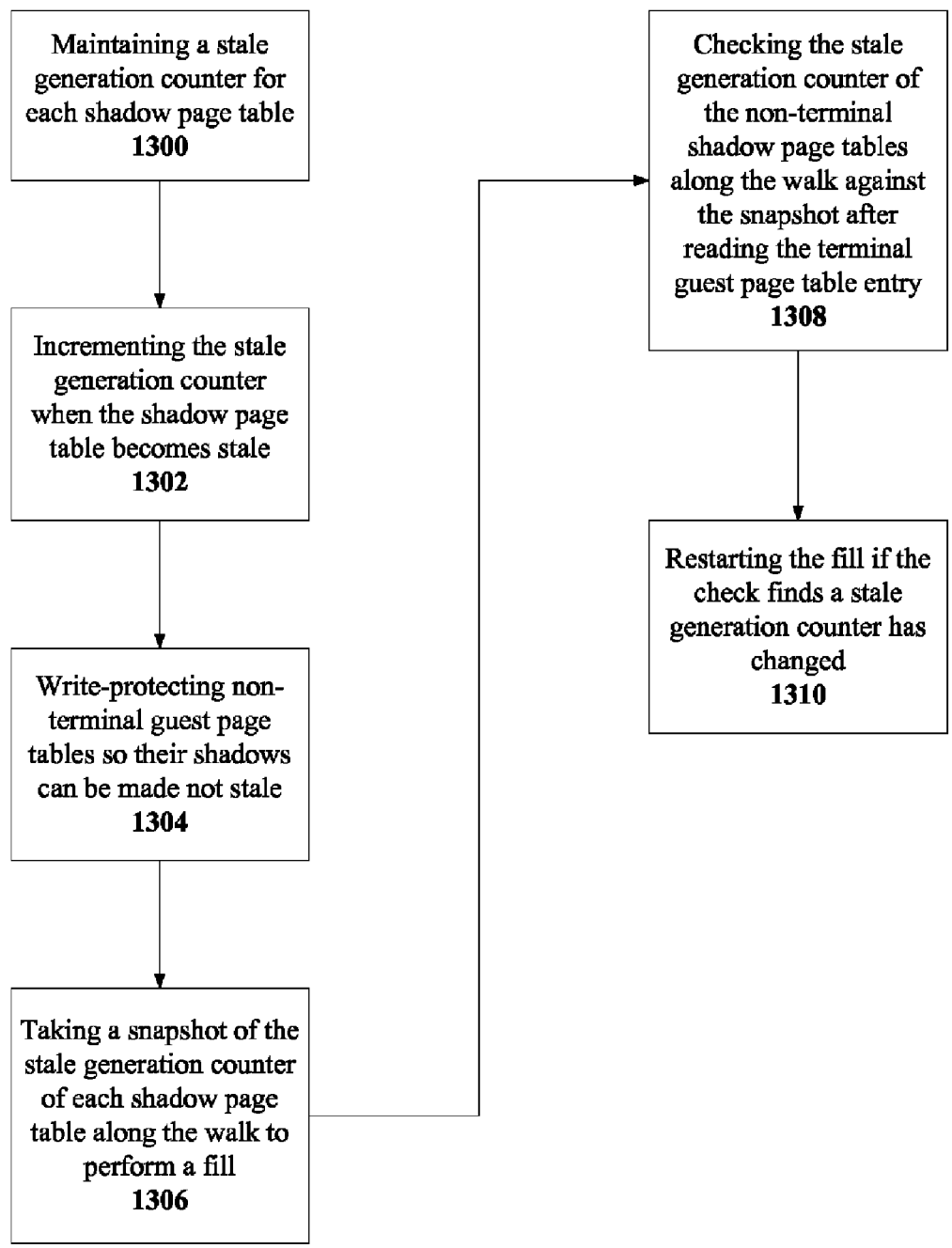
FIG. 13 illustrates that the virtual TLB correctly handles serializing instructions executed by a guest in a virtual machine with more than one virtual processor sharing the virtual TLB.

In another aspect of the presently disclosed subject matter, FIG. 13 shows that the virtual TLB correctly handles serializing instructions (i.e., instructions that prevent any other instructions from being recorded before and after them; a serializing instruction tells the processor that it must finish all previous instructions before executing it and finish the serializing instruction before executing any subsequent instructions) executed by a guest in a virtual machine with more than one virtual processor sharing the virtual TLB. Some processor architectures may prohibit a TLB fill from happening across a serializing instruction, so the VMM must make atomic its walk of guest page table trees to perform a virtual TLB fill, but other VPs may modify the guest page table tree as the VMM walks it. However, the complication is that most processor architectures do not support reading several locations in memory in an atomic manner.

This aspect enables the guest page table walk to be atomic with respect to guest operations. The VMM is able to intercept the creation of writable GVA-to-SPA translations to guest page tables during a virtual TLB fill, so it can detect when a guest modifies a guest page table, which makes its corresponding shadow page tables stale. The VMM maintains a stale generation counter for each SPT, which is updated when the shadowed guest page table is mapped writable. When servicing a virtual TLB fill, the VMM makes sure every non-terminal SPT along the walk is not stale and takes a snapshot of the stale generation counters of every non-terminal SPT along the walk. After it reads the terminal GPT entry, it can determine whether any of the non-terminal GPT entries have been modified by comparing the counters against the snapshot. If the guest did indeed modify one of the non-terminal GPTs, it must restart the fill in order to ensure the walk is atomic. If the guest did not, the walk was indeed atomic and the VMM can fill in the terminal SPT entry.

Thus, one exemplary embodiment of this aspect is shown in FIG. 13. At block 1300, a stale generation counter is maintained for each SPT. As was indicated above, there may be numerous SPTs in a virtual TLB. At block 1302, the stale generation counter can be incremented when a SPT becomes stale. At block 1304, during a virtual TLB, non-terminal guest page tables (GPTs) are write-protected so that their corresponding SPTs can be made not stale. At block 1306, a snapshot of the stale generation counters of each SPT can be taken, along a walk of a SPT tree when performing a fill. The stale generation counter and SPT entry can be read atomically by reading the counter, reading the entry, reading the counter again, comparing the two counter reads, and retrying if the two counter reads differ. At block 1308, the stale generation counters of any non-terminal SPTs can be checked along the walk, against the aforementioned snapshot, after reading the terminal GPT entry. Depending on the outcome of block 1308, at block 1310, fills may have to be restarted if the check performed at block 1308 finds a stale generation counter has changed.

Figure 14:
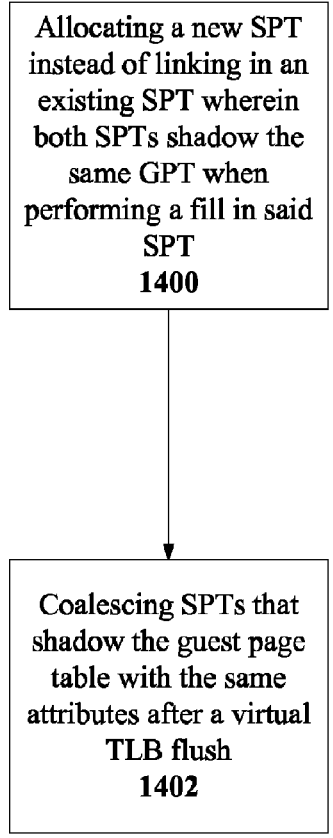
FIG. 14 illustrates the VMM allocates and links in a new SPT instead of zeroing and linking in an existing SPT and periodically coalesces two shadow page tables that shadow the same guest page table with the same attributes.

In another aspect of the presently disclosed subject matter, in FIG. 14, the VMM allocates and links in a new SPT instead of zeroing and linking in an existing SPT shadowing the same GPT and then periodically coalesces two or more shadow page tables that shadow the same guest page table with the same attributes. Some operating systems, such as Windows, share page tables between address spaces for VA ranges that are common to some or all address spaces. The VMM can share shadow page tables between shadow address spaces to take advantage of this behavior. However, the VMM must zero or validate a SPT and its descendents prior to linking it into a SPT tree to prevent bringing in stale translations. If a SPT is linked into a shadow address space and is actively being used by the guest, to link the SPT into another shadow address space, the VMM may have to zero the SPT to satisfy ordering guarantees of certain processor architectures, which may cause numerous misses in the virtual TLB.

Instead, the VMM can allocate and link in a new SPT for the time being, and it can periodically coalesce two SPTs that shadow the same guest page table (GPT) with the same attributes. The latter reduces the memory footprint of the virtual TLB and the former eliminates redundant fills for the same GVA-to-SPA translations caused by zeroing the existing SPT. An advantageous time to coalesce SPTs is after the virtual TLB has been flushed, since it is caching few translations at that point. The first time a guest page table is shadowed after a virtual TLB flush, the VMM coalesces the duplicate shadows. These concepts are reflected in FIG. 14, where at block 1402, SPTs that shadow guest page tables with the same attributes are coalesced according to some heuristic, such as after a virtual TLB flush (but those of skill in the art will readily appreciate other heuristics). And moreover, at block 1400, new SPTs are allocated instead of linking in an existing SPT when performing a fill.

Figure 15:
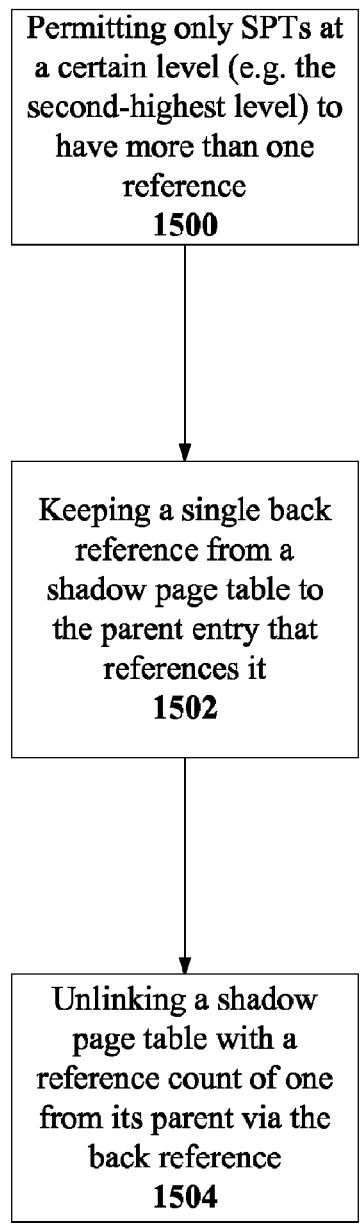
FIG. 15 illustrates the VMM shares a shadow page table between two shadow address spaces only at a specific level in the shadow page table tree.

In another aspect of the presently disclosed subject matter, as is shown in FIG. 15, the VMM shares a shadow page table between two shadow address spaces only at a specific level in the shadow page table tree. Some operating systems share only page tables at the second-highest level in a tree between address spaces for VA ranges that are common to some or all address spaces. This aspect takes advantage of this characteristic to apply a simplifying requirement as to how the VMM shares SPTs between shadow address spaces. With this approach, the VMM can keep a single back reference from a SPT not at the said level to the parent entry that references it. This reduces the cost of unlinking the SPT. Thus, per FIG. 15, at block 1500, only SPTs at the said level are permitted to have more than one reference. At step 1502, the VMM keeps a single back reference from a SPT not at the said level to a parent entry that references it. Then, at block 1504, a SPT not at the said level is unlinked from its parent via the back reference since it only has one parent.

Figure 16:
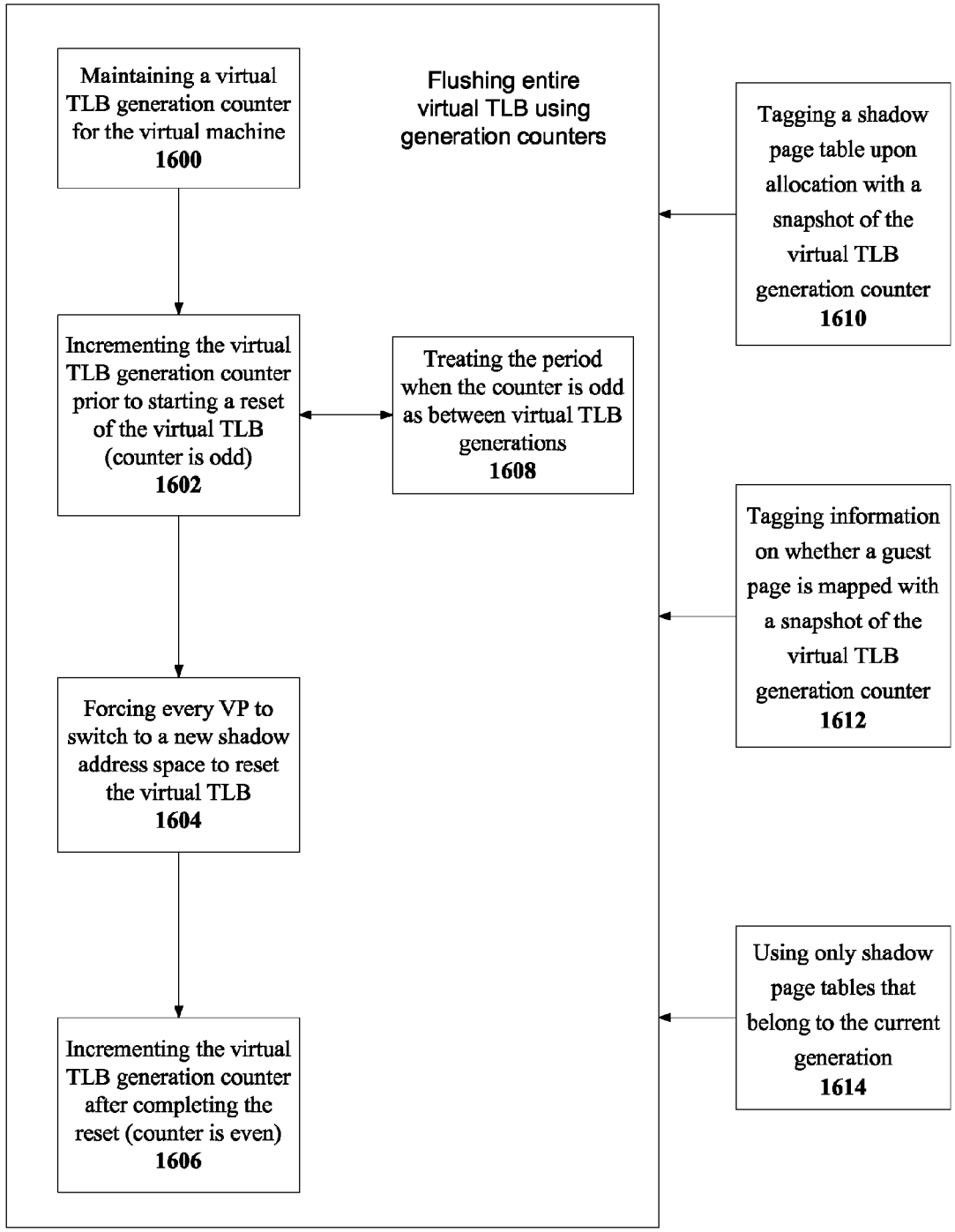
FIG. 16 illustrates that the VMM flushes the entire virtual TLB using a generation counter.

Finally, in another aspect of the presently disclosed subject matter, FIG. 16 shows that the VMM flushes the entire virtual TLB using a generation counter. This aspect enables the VMM to flush the entire virtual TLB without suspending all of the virtual processors, thereby increasing the parallelism in the system and avoiding the need for locks to synchronize changes to the virtual TLB. It associates certain data structures in the virtual TLB, such as SPTs, with a particular generation of the virtual TLB. Since the virtual TLB cannot be flushed atomically, the VMM must accommodate for the period between generations such that data structures are valid when they belong to the current generation or the two generations before and after the intermediate period if the virtual TLB is in that period.

Thus, as is shown at block 1600, this aspect maintains a virtual TLB generation counter for the virtual machine, and at block 1602, increments the virtual TLB generation counter prior to starting a reset of the virtual TLB (e.g. the counter can be odd numbered). At block 1604, every VP is forced to switch to a new shadow address space to make the reset (flush) of the virtual TLB effective, and then at block 1606, the virtual TLB generation counter is incremented after completing the reset (e.g. counter would be even numbered—per the current example). At this point, the virtual TLB is in a new generation (as opposed to at block 1600, when it was in a previous generation). The period between flushes of the virtual TLB is treated as belonging to both the previous and subsequent generation (see block 1608).

In this aspect, blocks 1610-1614 can be prerequisites for blocks 1600-1606. For example, at block 1610, shadow page tables can be tagged upon allocation with a snapshot of the virtual TLB generation counter, so that the VMM knows which SPTs belong to which generation (in case, for example, a SPT from generation X is found in the address space of generation Y). Another enhancement is shown at block 1612, where information (which can include data or associated metadata) is tagged on whether a guest page is mapped with a snapshot of the virtual TLB generation counter. Various indicators regarding such tagging can help the VMM determine the generational status of a SPT. Lastly, at block 1614, only SPTs are used that belong to the current generation. Thus, if a virtual processor is in generation X, only SPTs from that generation (X) will be used, but not others from previous generations W, Y, Z, and so on. When it is between generations X and Y, only SPTs from either generation will be used.

The methods, systems, and apparatuses of the presently disclosed subject matter may also be embodied in the form of program code (such as computer readable instructions) that is transmitted over some transmission medium, such as over electrical wiring or cabling, through fiber optics, or via any other form of transmission, wherein, when the program code is received (and/or stored on computer readable media) and loaded into and executed by a machine, such as an EPROM, a gate array, a programmable logic device (PLD), a client computer, such as that shown in the figure below, a video recorder or the like, the machine becomes an apparatus for practicing the present subject matter. When implemented on a general-purpose processor, the program code combines with the processor to provide a unique apparatus that operates to perform the saving and restoring functionality of the present subject matter.

Lastly, while the present disclosure has been described in connection with the preferred aspects, as illustrated in the various figures, it is understood that other similar aspects may be used or modifications and additions may be made to the described aspects for performing the same function of the present disclosure without deviating therefrom. For example, in various aspects of the disclosure, mechanisms were disclosed for coping with virtual machine architectures with multi-processors. However, other equivalent mechanisms to these described aspects are also contemplated by the teachings herein. Therefore, the present disclosure should not be limited to any single aspect, but rather construed in breadth and scope in accordance with the appended claims.

What is claimed:

1. A method for improving the scalability of virtual TLBs in multi-processor virtual machines, comprising:
    providing at least one virtual TLB; and
    sharing said at least one virtual TLB between at least two virtual processors from a plurality of virtual processors in a virtual machine environment, wherein said sharing involves performing at least one operation;
    said at least two virtual processors sharing memory in a non-uniform memory architecture (NUMA) node;
    allocating memory for said at least one virtual TLB from the NUMA node; and
    forwarding guest virtual address invalidation requests to at least one of said virtual TLBs based on a heuristic;
    wherein said at least one operation comprises:
        maintaining walk generation counters for corresponding said plurality of virtual processors in said virtual machine environment, wherein said walk generation counters are configured to be incremented to a first set of values when said virtual processors start accessing shadow page tables associated with said at least one virtual TLB, and wherein said walk generation counters are configured to be incremented to a second set of values when said virtual processors have finished accessing said shadow page tables; and
        preventing the repurposing of said shadow page tables with a non-zero reference count at the time of or since the last transition between said first set of values and said second set of values for one or more of shadow page table generation counters, thereby effectively locking said shadow page tables implicitly via said shadow page table generation counters.

2. The method according to claim 1, in association with said shadow page tables, further comprising:
    accessing a shadow page table (a) only through a reference from a higher-level shadow page table or (b) through a reference from a virtual processor if said shadow page table is a top-level shadow page table, only when a walk generation counter associated with a virtual processor accessing the shadow page table is at said first set of values;
    locking exclusive said shadow page table when said shadow page table is unreferenced to prevent new references to said shadow page table from being created;
    taking a snapshot of said walk generation counters corresponding to said virtual processors after locking exclusive said shadow page table; and
    wherein said shadow page table is reclaimed after all said generation counters corresponding to said virtual processors have arrived at said second set of values as verified by said snapshot.

3. The method according to claim 2, further comprising:
    providing a first list and a second list, wherein said first list is configured to represent a list of unreferenced shadow page tables, and said second list is configured to represent a list of locked shadow page tables that are prevented from being referenced;
    pushing at least one shadow page table associated with said shadow page tables that becomes unreferenced onto said first list;
    moving said at least one shadow page table from said first list onto said second list after locking said at least one shadow page table to prevent new references;
    taking said snapshot of said walk generation counters after pushing said at least one shadow page table onto said second list;
    deferring the freeing of said at least one shadow page table on said second list until said virtual processors have incremented their walk generation counters past said second values according to said snapshot.

4. The method according to claim 3, further comprising triggering the insertion and removal of at least one shadow page table from said second list based on heuristics such as the number of free shadow page table and the rate of allocations of shadow page table.

5. A method for improving the scalability of virtual TLBs in multi-processor virtual machines, comprising:
    providing at least one virtual TLB; and
    sharing said at least one virtual TLB between at least two virtual processors from a plurality of virtual processors in a virtual machine environment, wherein said sharing involves performing at least one operation;
    said at least two virtual processors sharing memory in a non-uniform memory architecture (NUMA) node;
    allocating memory for said at least one virtual TLB from the NUMA node; and
    forwarding guest virtual address invalidation requests to at least one of said virtual TLBs based on a heuristic;
    wherein said at least one operation comprises:
        using fill generation counters corresponding to said plurality of virtual processors, wherein said fill generation counters are configured to be incremented to a first set of values prior to starting a fill in said virtual TLB, and wherein said fill generation counters are configured to be incremented to a second set of values after said fill; and wherein an invalidation request is performed only after all fill generation counters corresponding to said plurality of virtual processors in said virtual machine environment have arrived at said second set of values.

6. A method for improving the scalability of virtual TLBs in multi-processor virtual machines, comprising:
providing at least one virtual TLB; and
sharing said at least one virtual TLB between at least two virtual processors from a plurality of virtual processors in a virtual machine environment, wherein said sharing involves performing at least one operation;
said at least two virtual processors sharing memory in a non-uniform memory architecture (NUMA) node;
allocating memory for said at least one virtual TLB from the NUMA node; and
forwarding guest virtual address invalidation requests to at least one of said virtual TLBs based on a heuristic;
wherein said at least one operation comprises:
defining a virtual TLB mapped state, a hardware TLB mapped state, and an un-mapped state for at least one guest page associated with said virtual TLB;
transitioning from said virtual TLB mapped state to said hardware TLB mapped state upon invalidation of all shadow page table translations in said virtual TLB that point to said at least one guest page;
initiating a hardware TLB flush on every physical processor that the virtual machine environment has used based on heuristics such as the number of guest pages in the hardware TLB mapped state; and
transitioning from said hardware TLB mapped state to said un-mapped state, wherein any hardware TLB translations on all physical processors underlying said shadow page table translations are eliminated in batched manner.

7. The method according to claim 1, wherein said at least one operation further comprises:
determining a NUMA node on which a guest page table to be shadowed resides; and
allocating a page for a shadow page table from the memory of said NUMA node, wherein said shadow page table caches translations for said guest page table, and wherein said allocating increases the likelihood that said shadow page table is on the same NUMA node as a processor that is walking said shadow page table.

8. A method for improving the scalability of virtual TLBs in multi-processor virtual machines, comprising:
providing at least one virtual TLB; and
sharing said at least one virtual TLB between at least two virtual processors from a plurality of virtual processors in a virtual machine environment, wherein said sharing involves performing at least one operation;
said at least two virtual processors sharing memory in a non-uniform memory architecture (NUMA) node;
allocating memory for said at least one virtual TLB from the NUMA node; and
forwarding guest virtual address invalidation requests to at least one of said virtual TLBs based on a heuristic;
wherein said at least one operation comprises:
maintaining a stale generation counter for a shadow page table in said virtual TLB;
incrementing said stale generation counter if said shadow page table becomes stale;
write-protecting a non-terminal guest page table so that said shadow page table can be made not stale by removing stale entries;
taking a snapshot of said stale generation counter for said shadow page table and any other shadow page table, while walking a tree of shadow page tables down to a terminal shadow page table to perform a fill at a first time;
checking the most recent state of said stale generation counter and any other generation counter for each shadow page table along said walk of said tree of shadow page tables against said snapshot at a second time after the terminal guest page table entry had been read; and
wherein if said checking yields an incremented stale generation counter for at least one non-terminal shadow page table, restarting the virtual TLB fill.

9. A method for improving the scalability of virtual TLBs in multi-processor virtual machines, comprising:
providing at least one virtual TLB; and
sharing said at least one virtual TLB between at least two virtual processors from a plurality of virtual processors in a virtual machine environment, wherein said sharing involves performing at least one operation;
said at least two virtual processors sharing memory in a non-uniform memory architecture (NUMA) node;
allocating memory for said at least one virtual TLB from the NUMA node; and
forwarding guest virtual address invalidation requests to at least one of said virtual TLBs based on a heuristic;
wherein said at least one operation comprises:
allocating and linking in a new shadow page table, for said virtual TLB, to shadow a guest page table instead of zeroing and linking in an existing shadow page table that already shadows said guest page table when performing a fill that requires linking in said existing shadow page table.

10. The method according to claim 1, wherein said at least one operation further comprises:
coalescing a first shadow page table and a second shadow page table when said first shadow page table and said second shadow page table shadow a guest page table with substantially the same attributes, wherein said coalescing is performed according to a heuristic.

11. A method for improving the scalability of virtual TLBs in multi-processor virtual machines, comprising:
providing at least one virtual TLB; and
sharing said at least one virtual TLB between at least two virtual processors from a plurality of virtual processors in a virtual machine environment, wherein said sharing involves performing at least one operation;
said at least two virtual processors sharing memory in a non-uniform memory architecture (NUMA) node;
allocating memory for said at least one virtual TLB from the NUMA node; and
forwarding guest virtual address invalidation requests to at least one of said virtual TLBs based on a heuristic;
wherein said at least one operation comprises:
permitting only shadow page tables at a specific level of a shadow page table tree to be shared between at least two shadow address spaces;
keeping a single back reference for a given shadow page table since said given shadow page table not at said specific level is not shared and has a reference count of at most one; and
unlinking said shadow page table not at said specific level from its only parent by following said single back reference.

12. A method for improving the scalability of virtual TLBs in multi-processor virtual machines, comprising:
providing at least one virtual TLB; and
sharing said at least one virtual TLB between at least two virtual processors from a plurality of virtual processors in a virtual machine environment, wherein said sharing involves performing at least one operation;

said at least two virtual processors sharing memory in a non-uniform memory architecture (NUMA) node;

allocating memory for said at least one virtual TLB from the NUMA node; and forwarding guest virtual address invalidation requests to at least one of said virtual TLBs based on a heuristic;

said at least one operation configured for flushing said virtual TLB using a generation counter, further comprising:

maintaining a virtual TLB generation counter for a virtual machine;

incrementing said virtual TLB generation counter to a first value prior to starting a reset of said virtual TLB associated with said virtual machine;

forcing every virtual processor corresponding to said plurality of virtual processors in said virtual machine to switch to a new shadow address space to reset said virtual TLB; and incrementing said virtual TLB generation counter to a second value after completing said reset, and wherein said first and second values represent different generations of said virtual TLB, wherein said reset resides between said generations.

13. The method according to claim 12, further comprising:

tagging a shadow page table in said virtual TLB upon allocation with a snapshot of said virtual TLB generation counter;

tagging information on whether a guest page is mapped with said snapshot of said virtual TLB generation counter; and using only shadow page tables that belong to the current generation of said generations.

14. A system for improving the scalability of virtual TLBs in multi-processor virtual machines, comprising:

a first subsystem comprising at least one virtual TLB;

a second subsystem comprising at least two virtual processors from a plurality of virtual processors in a single virtual machine that share said at least one virtual TLB;

a third subsystem that maintains walk generation counters for corresponding said plurality of virtual processors in said virtual machine environment, wherein said walk generation counters are configured to be incremented to a first set of values when said virtual processors start accessing shadow page tables associated with said at least one virtual TLB, and wherein said walk generation counters are configured to be incremented to a second set of values when said virtual processors have finished accessing said shadow page tables; and a fourth subsystem that prevents the repurposing of said shadow page tables with a non-zero reference count at the time of or since the last transition between said first set of values and said second set of values for one or more of shadow page table generation counters, thereby effectively locking said shadow page tables implicitly via said shadow page table generation counters.

15. The system according to claim 14, further comprising:

a fifth subsystem that determines a NUMA node on which a guest page table to be shadowed resides; and a sixth subsystem that allocates a page for a shadow page table from the memory of said NUMA node, wherein said shadow page table caches translations for said guest page table, and wherein said allocating increases the likelihood that said shadow page table is on the same NUMA node as a processor that is walking said shadow page table.

16. A computer readable storage medium having stored thereon computer executable instructions for improving the scalability of virtual TLBs in multi-processor virtual machines, comprising:

a first instruction that provides use of at least one virtual TLB; and a second instruction that provides the sharing of said at least one virtual TLB between at least two virtual processors from a plurality of virtual processors in a single virtual machine environment, wherein said sharing involves performing at least one operation;

a third instruction that maintains walk generation counters for corresponding said plurality of virtual processors in said virtual machine environment, wherein said walk generation counters are configured to be incremented to a first set of values when said virtual processors start accessing shadow page tables associated with said at least one virtual TLB, and wherein said walk generation counters are configured to be incremented to a second set of values when said virtual processors have finished accessing said shadow page tables; and a fourth instruction that prevents the repurposing of said shadow page tables with a non-zero reference count at the time of or since the last transition between said first set of values and said second set of values for one or more of shadow page table generation counters, thereby effectively locking said shadow page tables implicitly via said shadow page table generation counters.

* * * * *